United States Patent [19]
Voss et al.

[11] Patent Number: 5,544,484
[45] Date of Patent: Aug. 13, 1996

[54] ENGINE INDUCTION AIR DRIVEN ALTERNATOR

[75] Inventors: Mark G. Voss, Franksville, Wis.; Gregory E. Peterson, Sylvan Lake, Mich.; William O. Harvey; Randall L. Perrin, both of Cadillac, Mich.

[73] Assignee: Nartron Corporation, Reed City, Mich.

[21] Appl. No.: 282,708

[22] Filed: Jul. 29, 1994

Related U.S. Application Data

[63] Continuation-in-part of Ser. No. 136,666, Oct. 14, 1993, which is a continuation-in-part of Ser. No. 12,942, Feb. 3, 1993.

[51] Int. Cl.$^6$ ........................................... F16D 31/02
[52] U.S. Cl. ................................................. 60/397
[58] Field of Search .......................... 60/397; 415/144, 415/151, 173.4

[56] References Cited

U.S. PATENT DOCUMENTS

| | | | |
|---|---|---|---|
| 2,840,343 | 6/1958 | Brandt et al. | 415/173.4 |
| 3,299,629 | 1/1967 | Bouchard | 60/39 |
| 3,346,175 | 10/1967 | Wiles | 415/173.4 |
| 4,177,005 | 12/1979 | Bozung et al. | 415/151 |
| 4,827,170 | 5/1989 | Kawamura et al. | 417/407 |
| 5,394,848 | 3/1995 | Tsutsumi et al. | 60/397 |

FOREIGN PATENT DOCUMENTS

92/9800  6/1992  WIPO ........................................ 60/397

Primary Examiner—F. Daniel Lopez
Attorney, Agent, or Firm—C. J. Fildes & Co.

[57] ABSTRACT

A turboalternator and air flow control assembly for mounting on a combustion air intake of an internal combustion engine comprises a body having an inlet and an outlet defining an air flow path, a nozzle carrier in the body defining a plurality of turbine nozzles spaced arcuately about and generally parallel with a central axis, the nozzles having inlet and outlet ends and forming a portion of the air flow path, a rotor mounted in the body on bearings for rotation on the central axis, the rotor driving an electric generator and including a turbine wheel having blades axially adjacent and radially aligned with said nozzles, a bypass passage in the body and connecting the inlet and outlet separately from the nozzles, and a bypass valve in the bypass passage and operable to control air flow through said bypass passage. Various embodiments including concentric or parallel bypass passage arrangements and having axial or radial gap alternators with permanent magnet rotors are featured. A battery charging system and method for voltage regulation of turbine and engine driven alternators combined in the system are also featured.

20 Claims, 35 Drawing Sheets

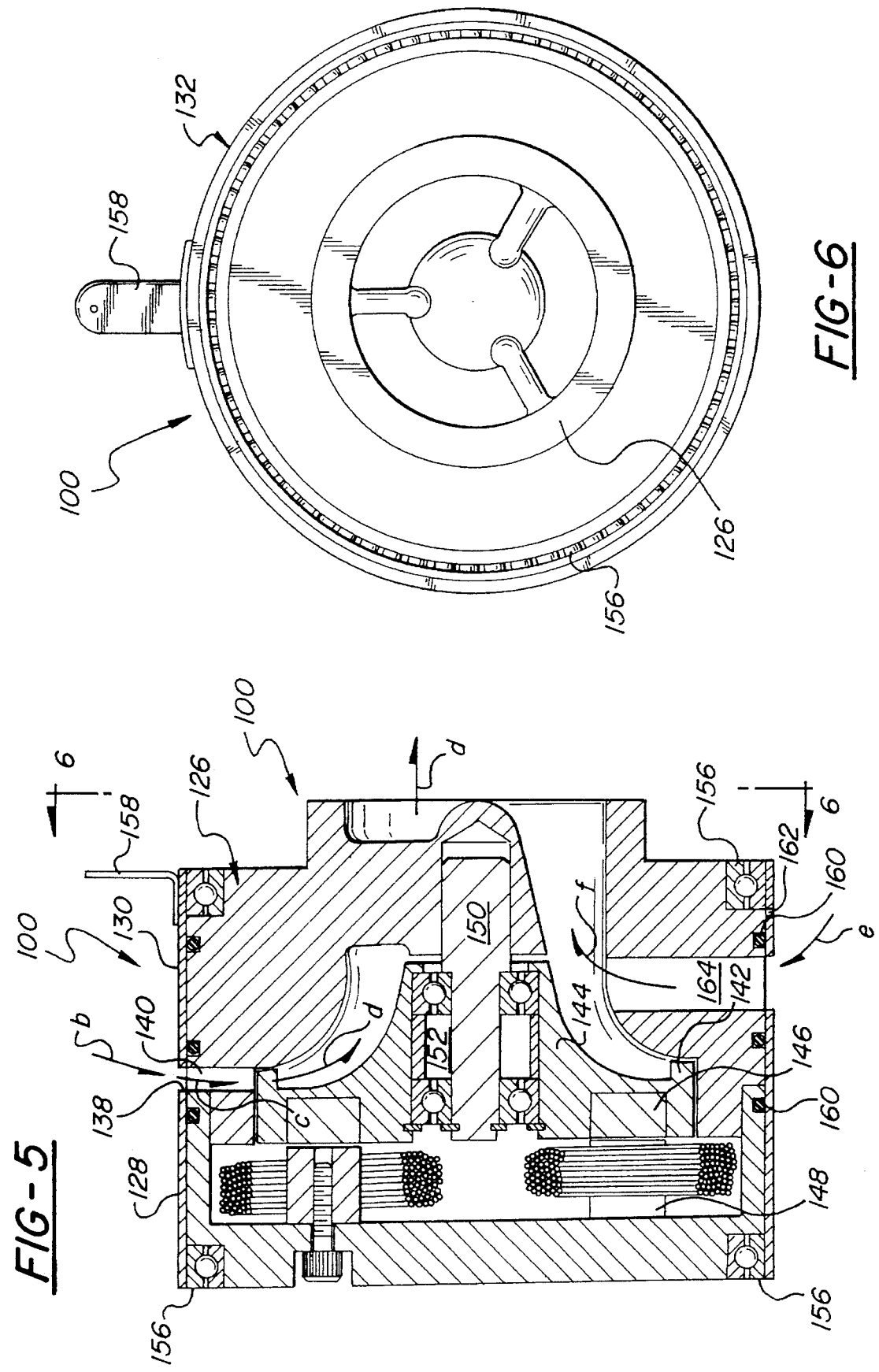

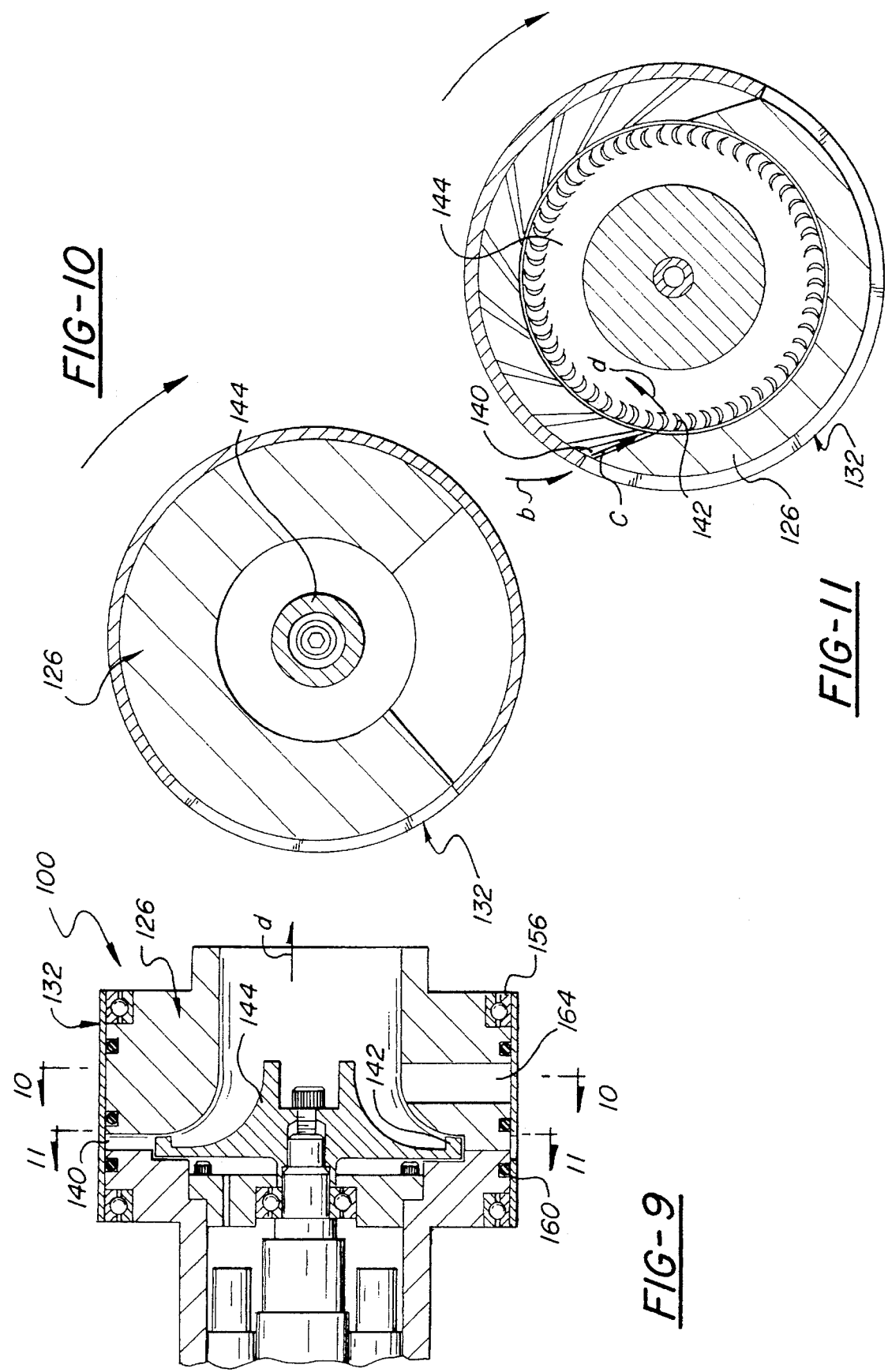

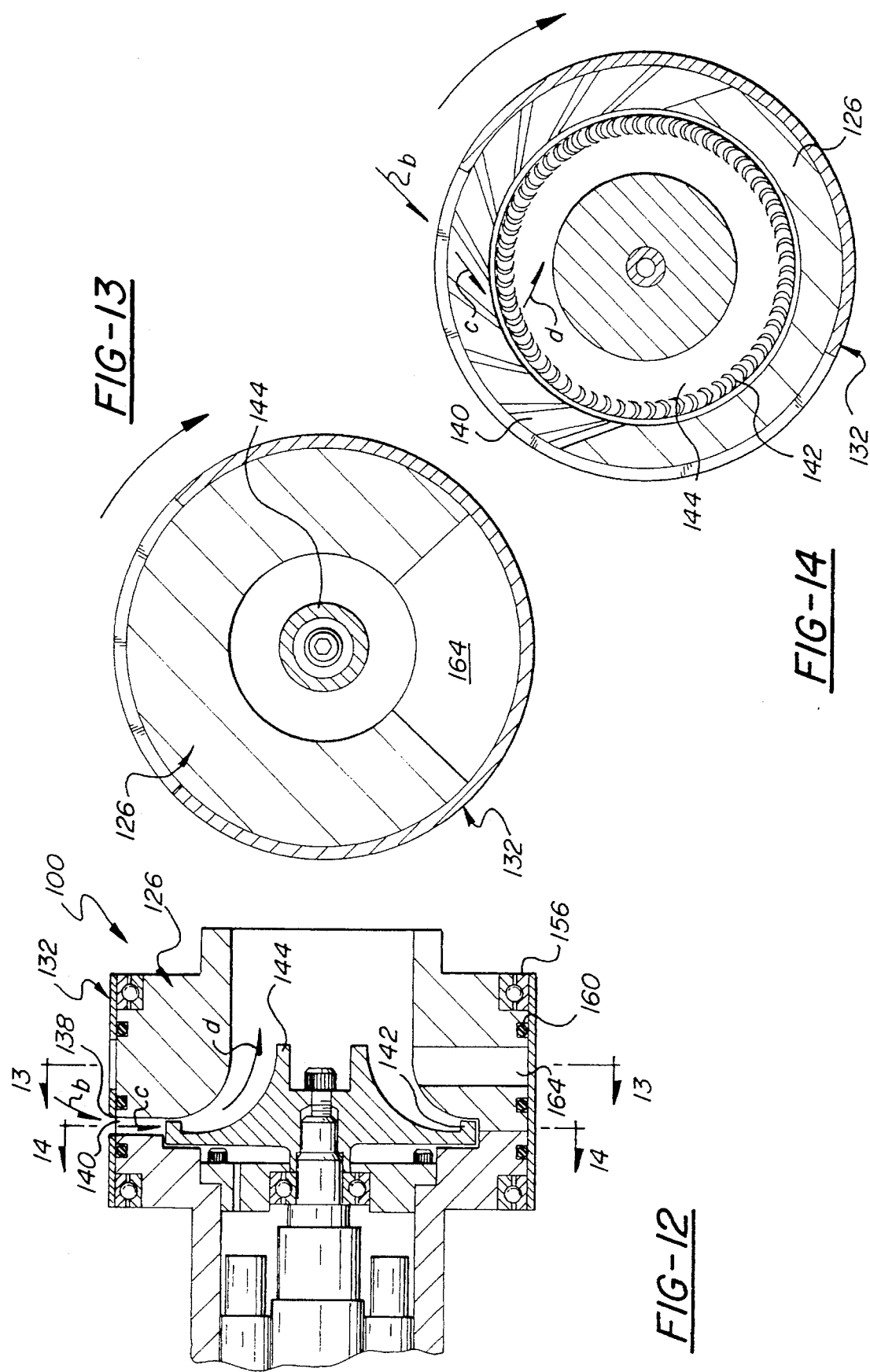

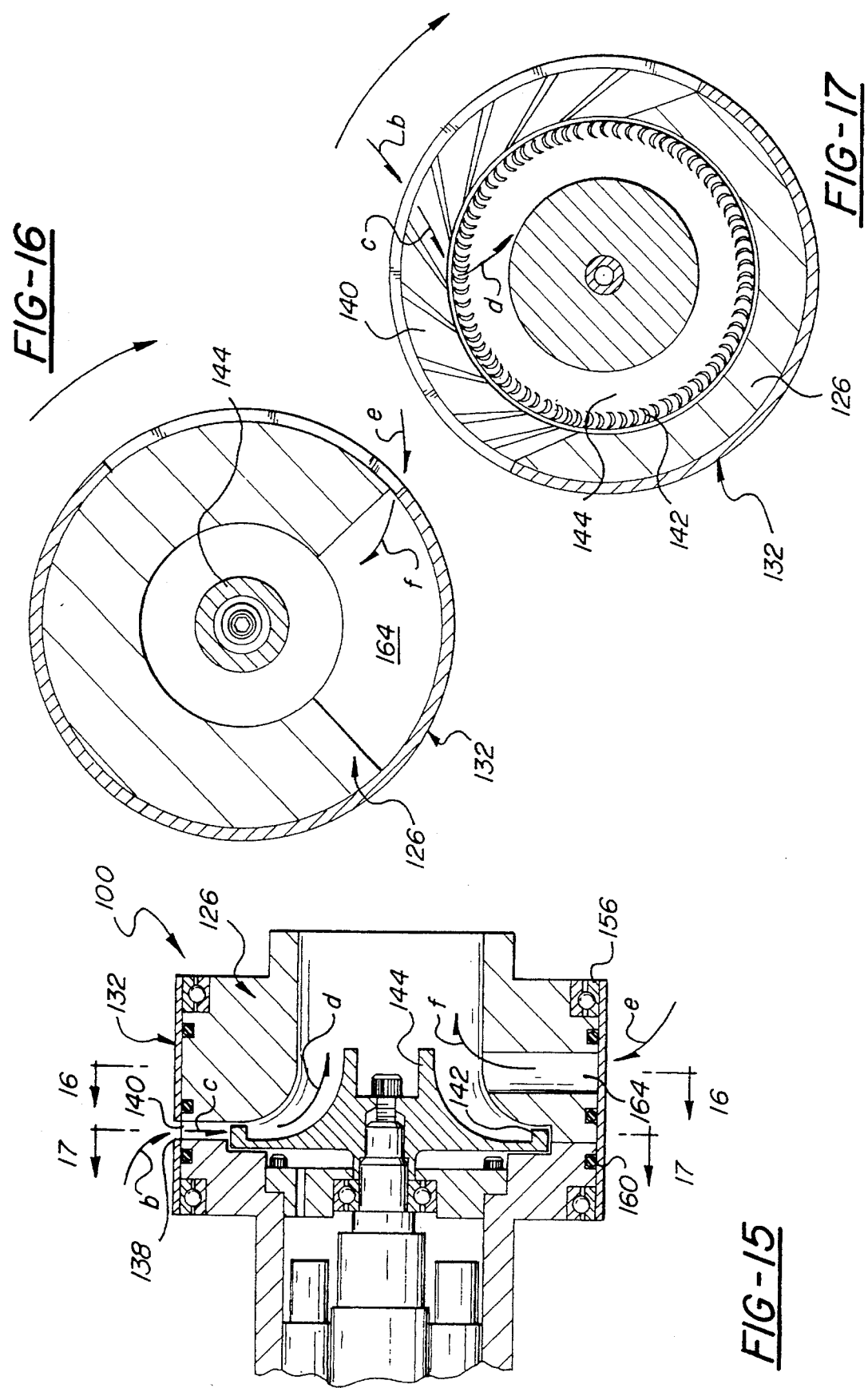

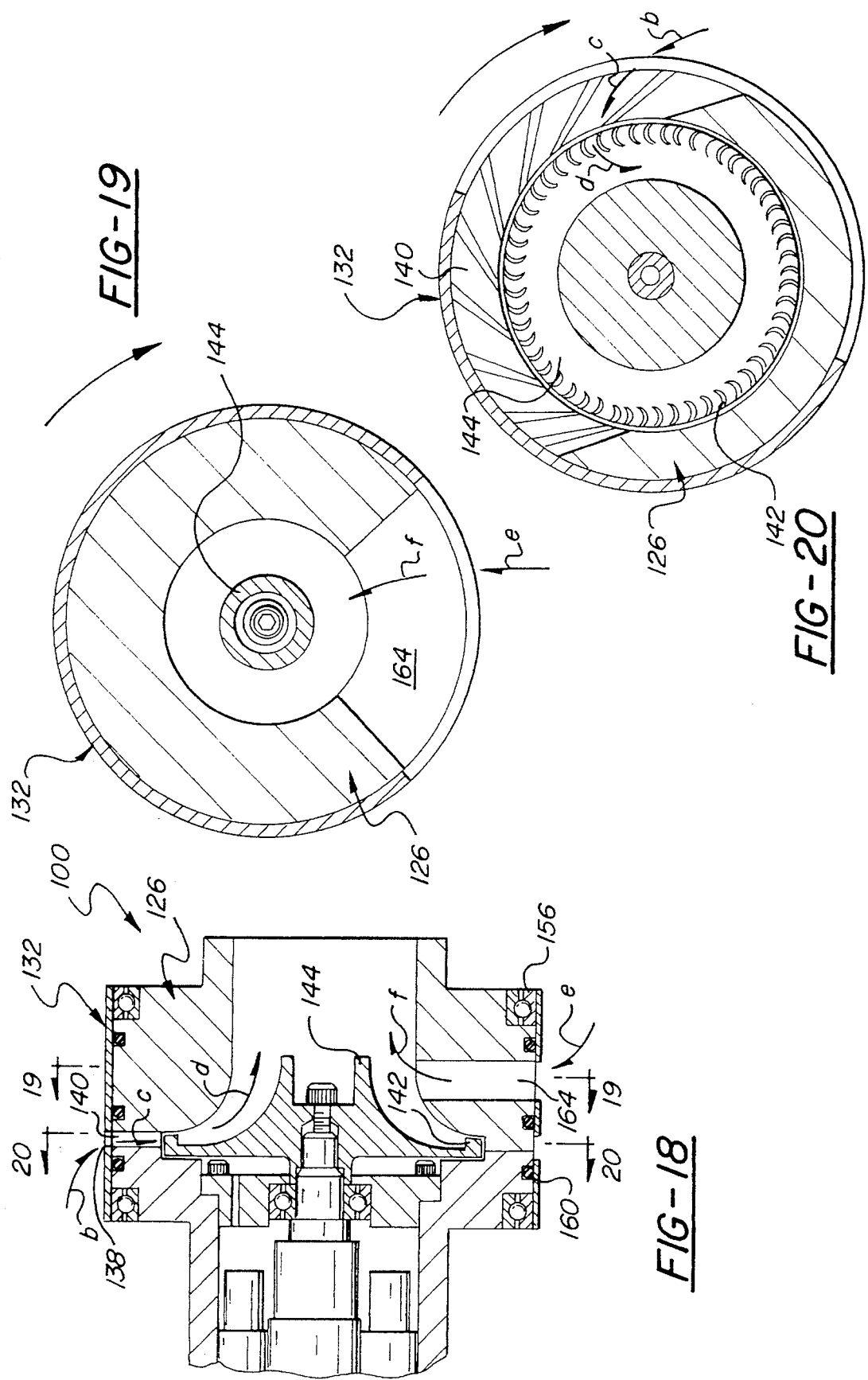

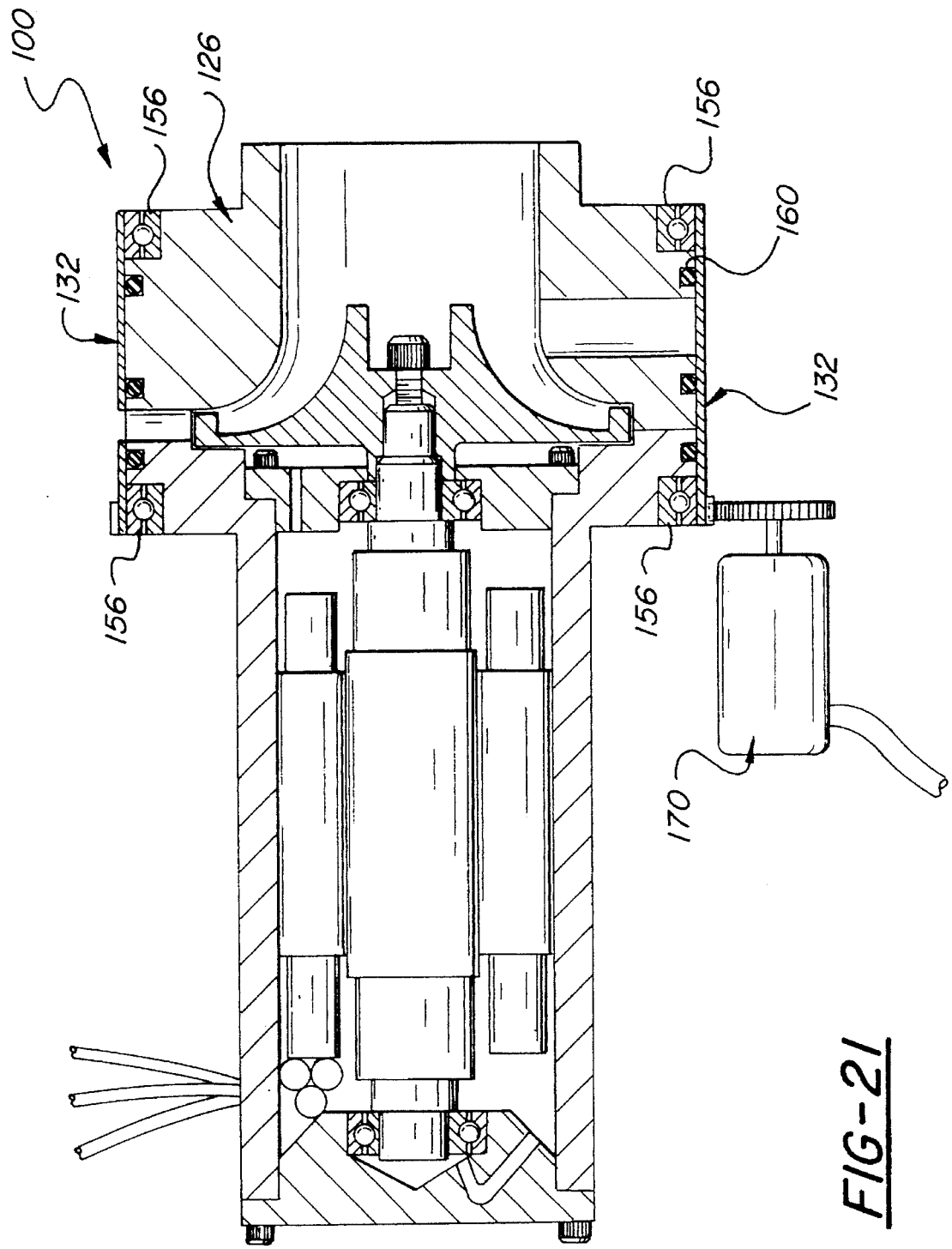

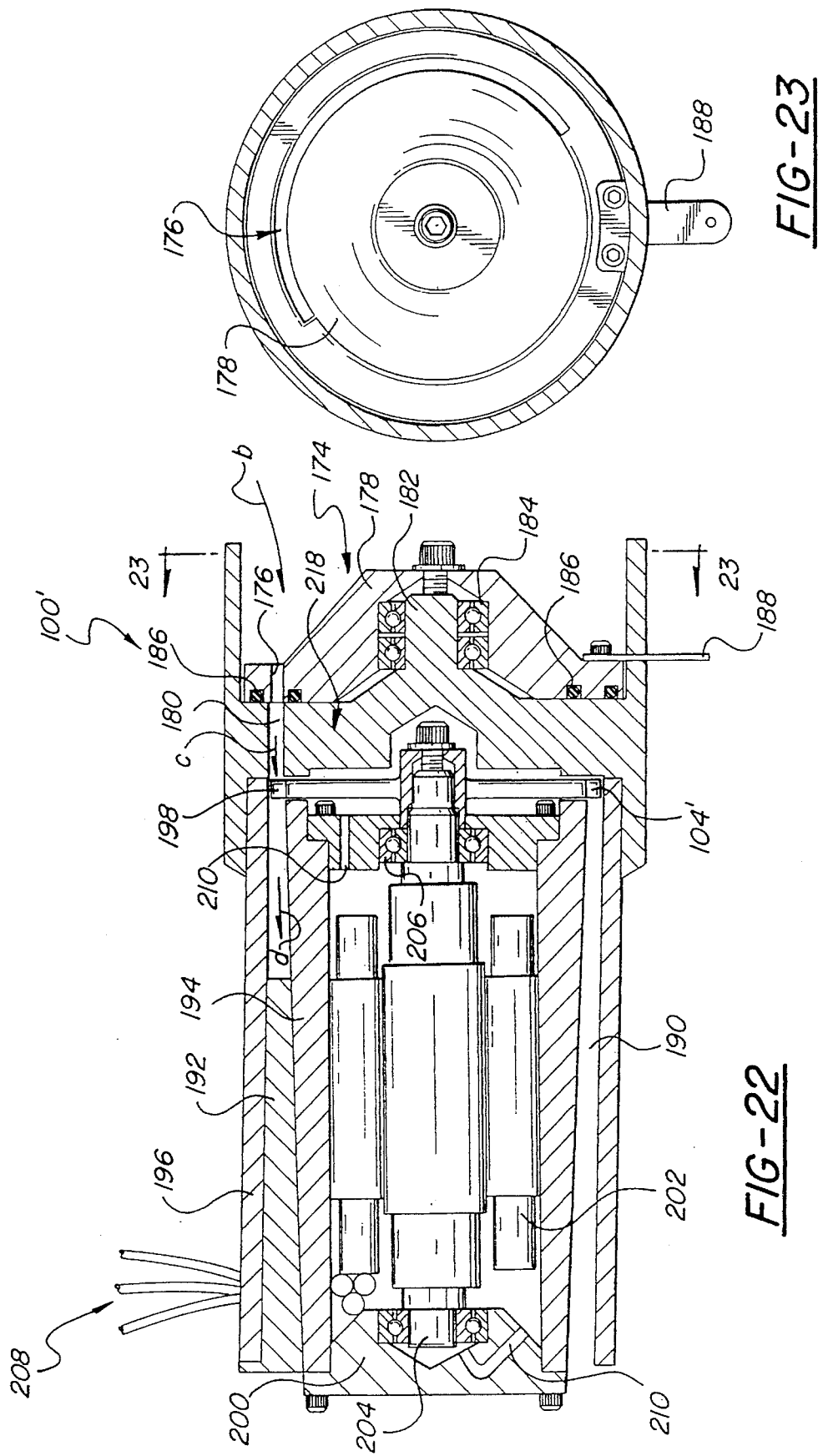

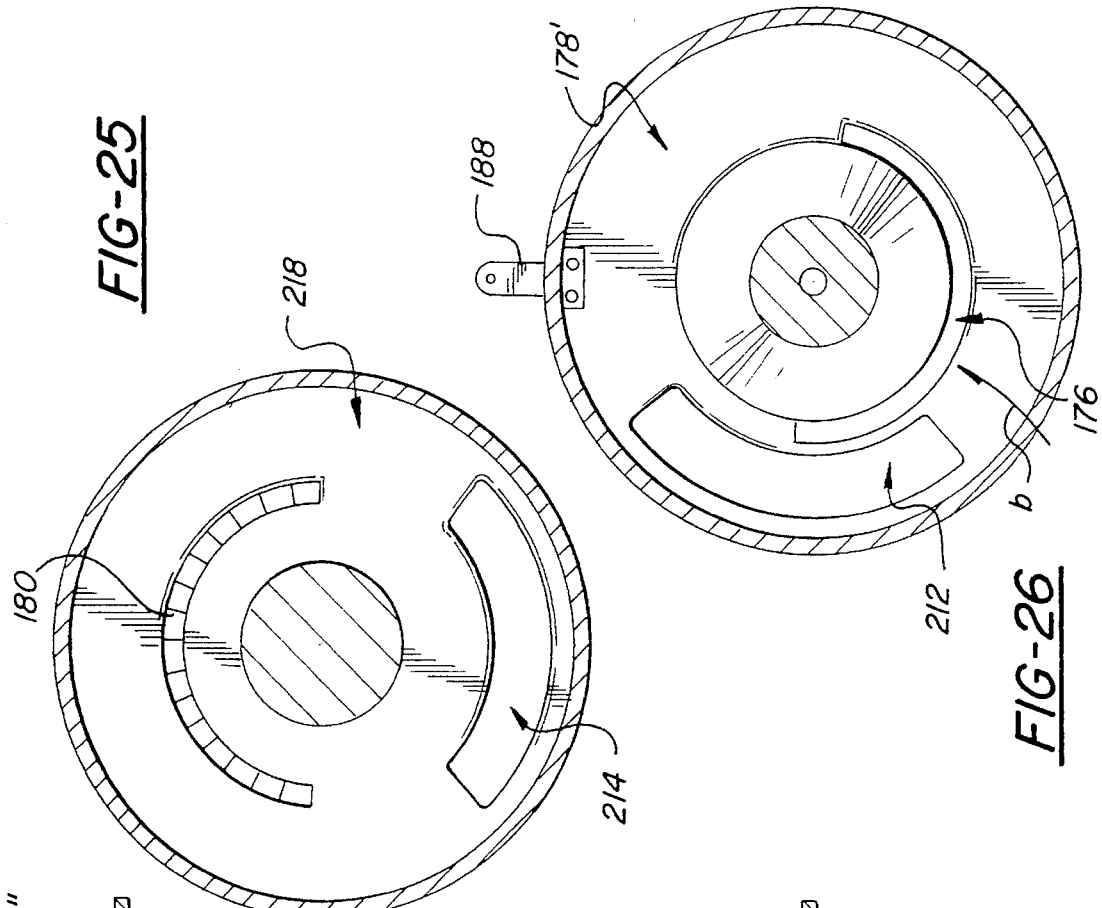
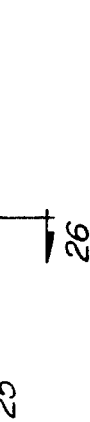
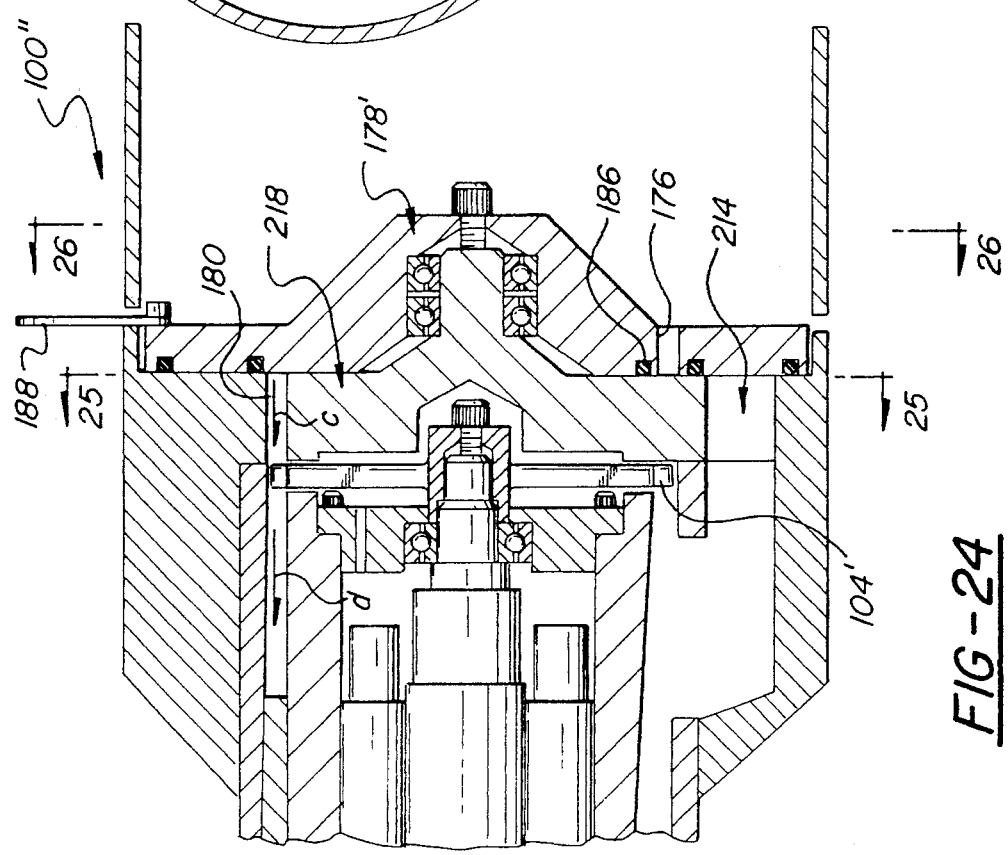

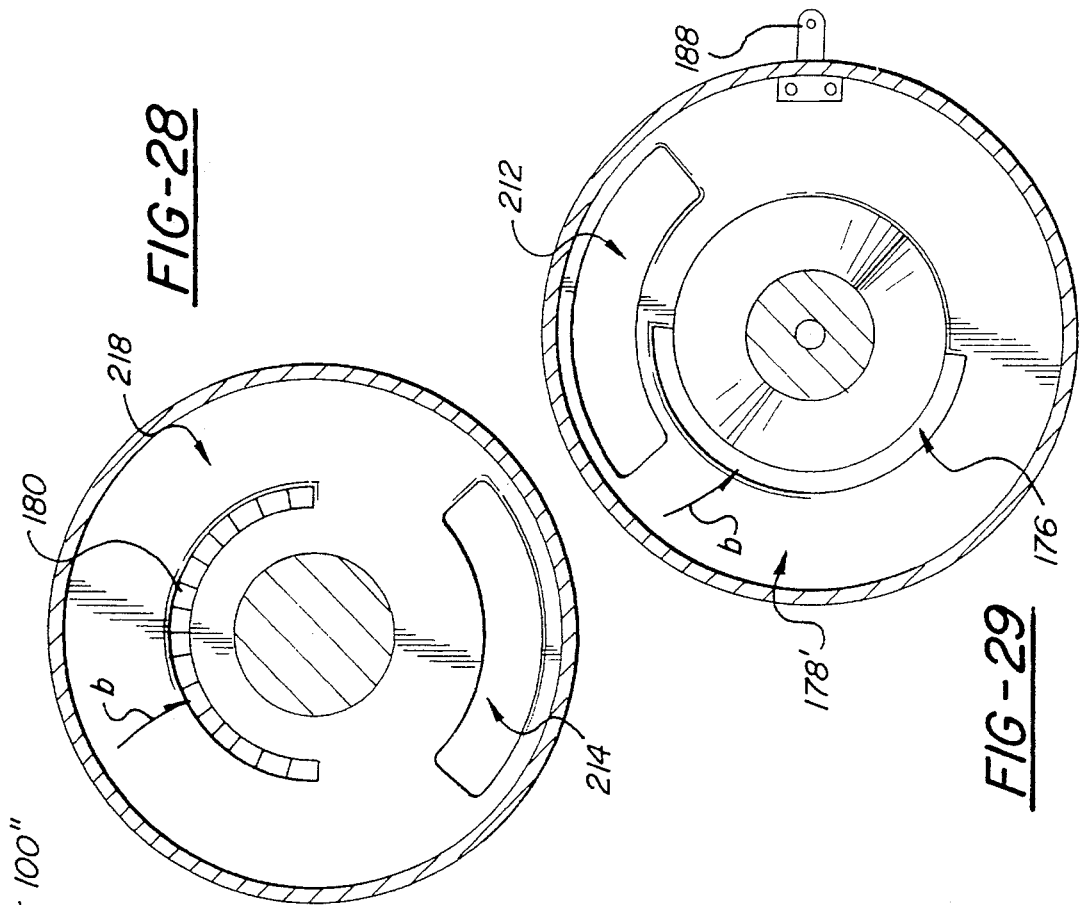
FIG-28
FIG-29
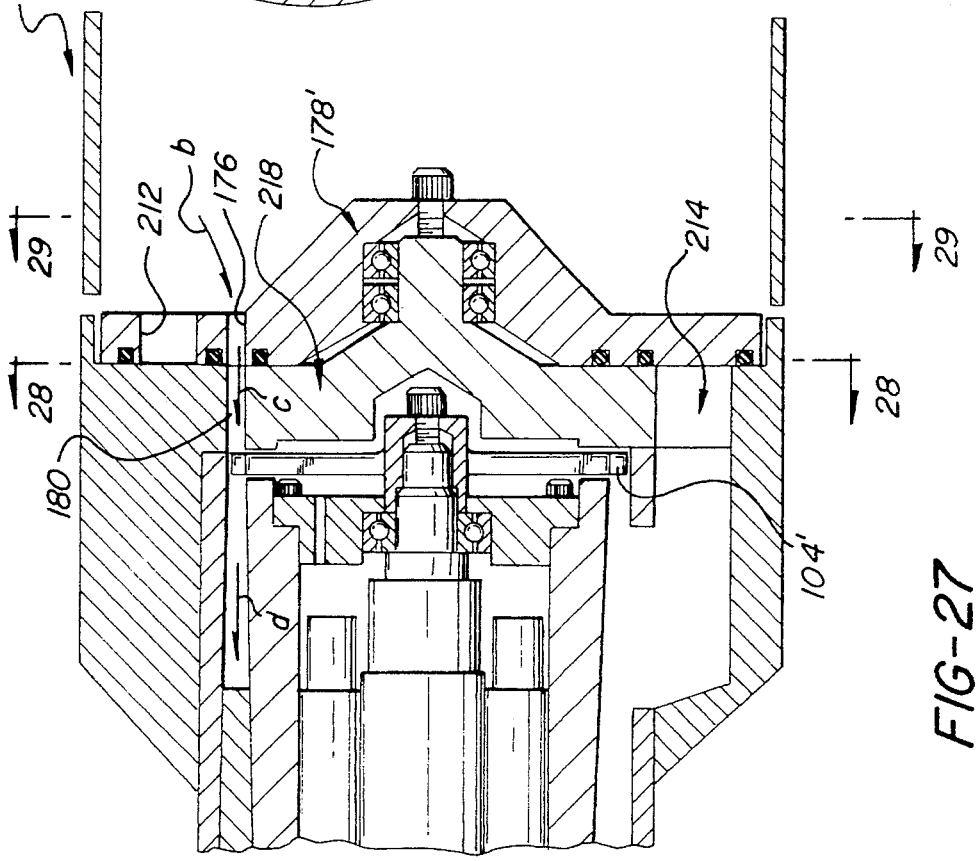
FIG-27

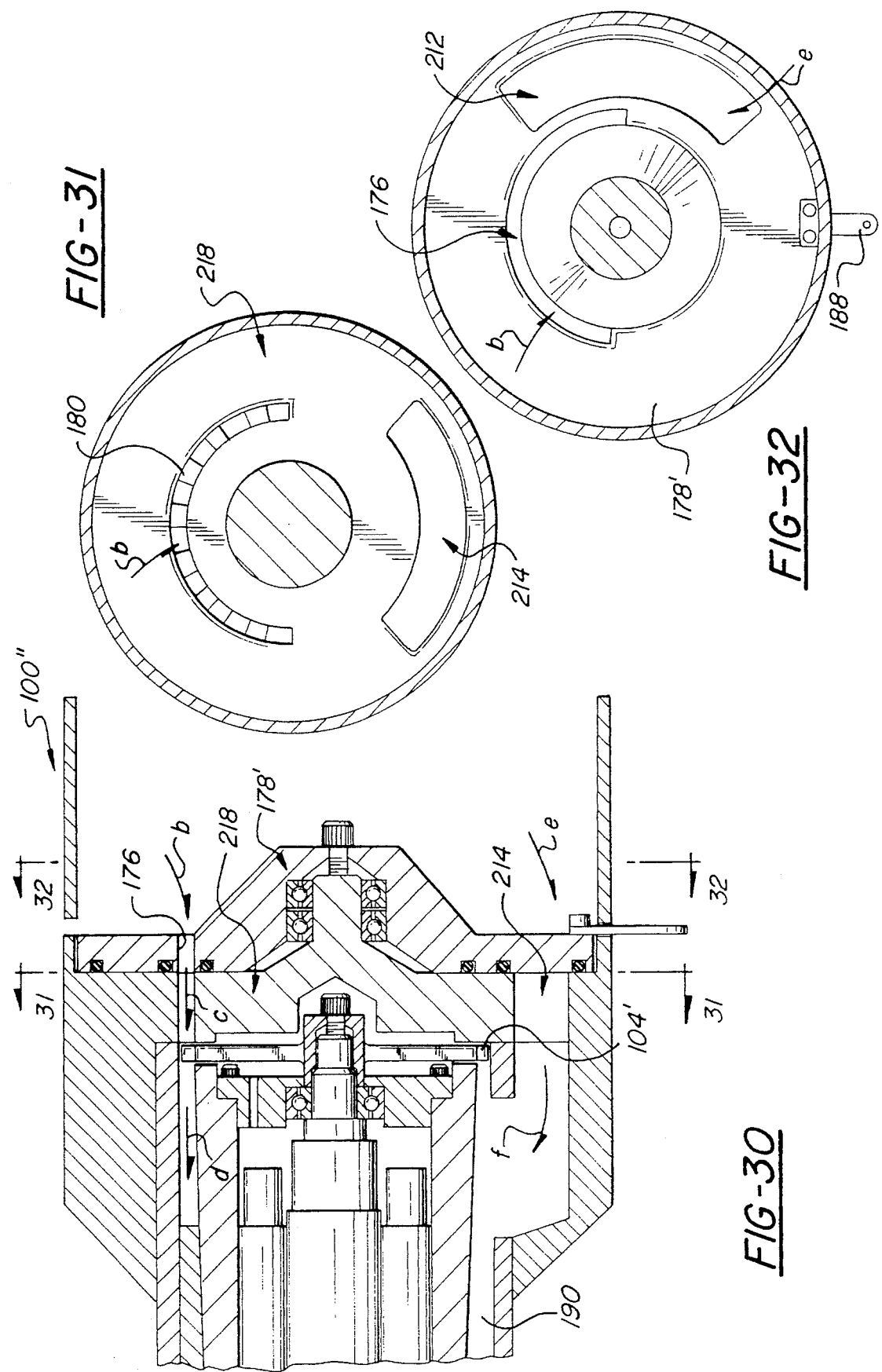

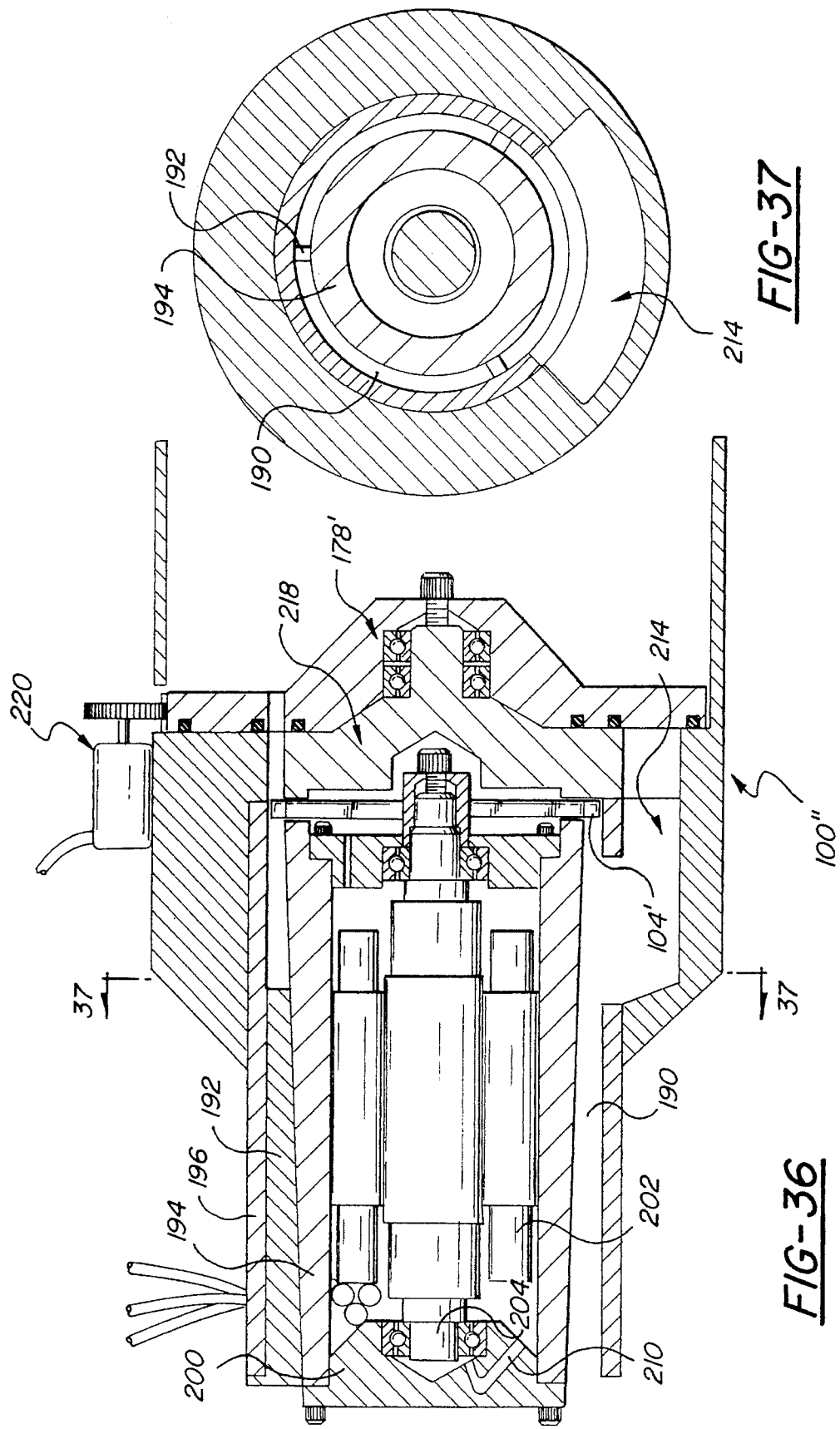

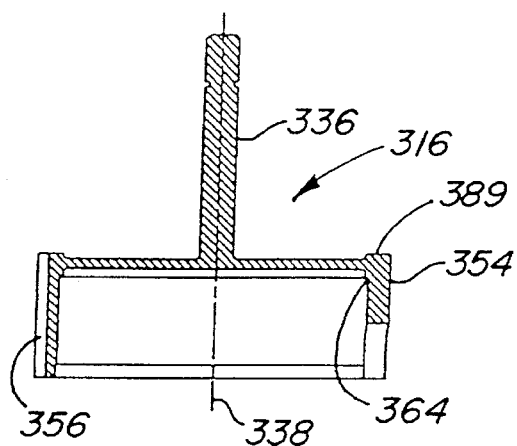
FIG - 46
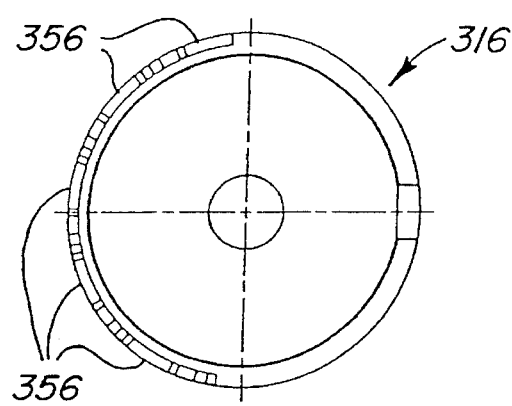
FIG - 47
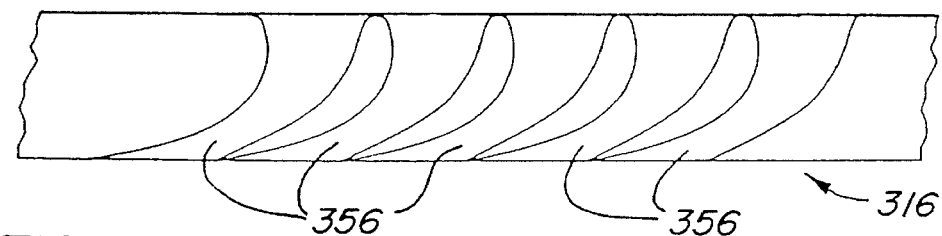
FIG - 48
FIG - 49
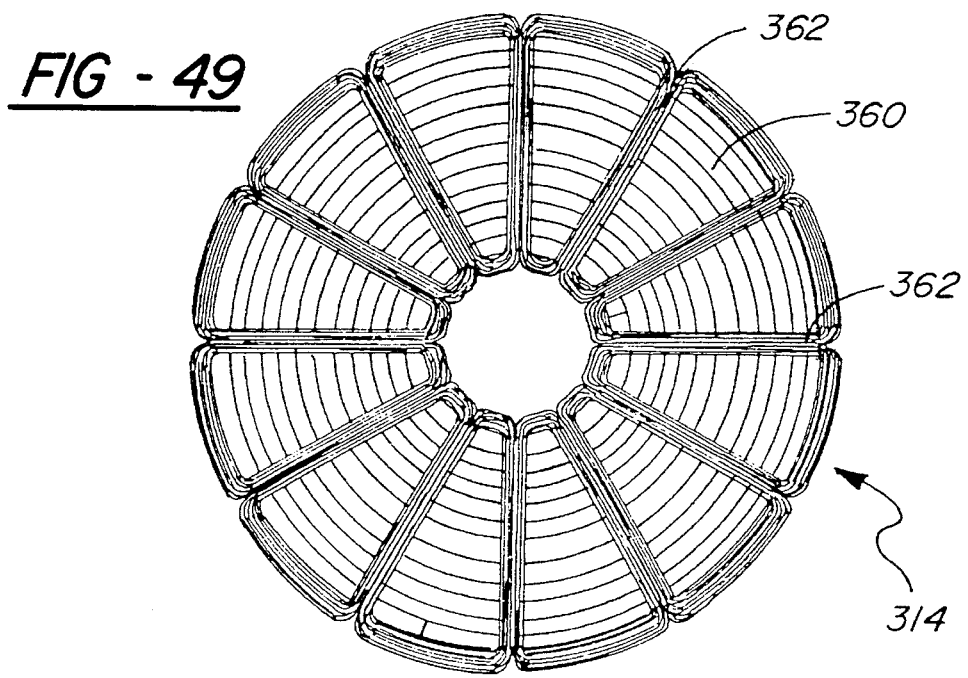

ENGINE INDUCTION AIR DRIVEN ALTERNATOR

CROSS-REFERENCE TO RELATED APPLICATIONS

This is a continuation-in-part of U.S. patent application Ser. No. 08/136,666 filed Oct. 14, 1993 which is a continuation-in-part of U.S. patent application Ser. No. 08/012,942 filed Feb. 3, 1993 and now abandoned.

FIELD OF THE INVENTION

The present invention relates to energy conversion devices for use in the induction system of an internal combustion engine having an air flow control or throttle and, more particularly, to an induction air driven turboalternator (or turbogenerator) which also defines an induction air flow control

BACKGROUND OF THE INVENTION

Copending U.S. patent application Ser. No. 08/136,666 filed Oct. 14, 1993, the disclosure of which is hereby incorporated by reference, pertains to induction air driven alternators (or generators) for and in combination with engines and the like. Also disclosed is the use of such alternators in a method for generating electricity from induction air energy normally lost through throttling of the intake for engine power control.

SUMMARY OF THE INVENTION

The present invention involves further developments and improvements of the concepts, combinations and devices disclosed in the prior application. In particular, this invention provides improved forms of turboalternator and air flow control assemblies for use and in combination with an engine combustion air intake. Application in other suitable systems with adequate mass flow and pressure is also envisioned.

The turboalternator system is preferably matched to the engine so that, under normal steady state city and highway driving, all the intake air to the engine is conducted through the turbine for electric power generation to operate vehicle accessories and/or charge the battery. A turbine nozzle inlet control valve controls flow through multiple inlet nozzles to maintain turbine efficiency while varying engine intake air flow to control engine power. A turbine bypass allows additional air to bypass the turbine and flow to the engine intake with low restriction when additional power is needed under conditions of high load, acceleration or high speed.

The invention contemplates two basic arrangements for the turbine bypass which are termed coaxial flow path and parallel flow path designs. In both, multiple turbine nozzles are arranged in arcuately spaced side by side relationship forming a flow path defining an arc of a circle centered on the rotational axis of the associated turbine. In the coaxial designs, the bypass flow is directed through an annular passage also centered on the turbine axis and located either outward or inward of the turbine nozzles and associated turbine blades. In the parallel path designs, the bypass passage is located to one side of the turbine and its nozzles and is laterally spaced from the turbine axis. The parallel bypass provides a separate (parallel) flow path for intake air which need not run geometrically parallel to the turbine axis.

These and other features and advantages of the invention will be more fully understood from the following detailed description of the invention taken together with the accompanying drawings.

BRIEF DESCRIPTION OF THE DRAWINGS

In the drawings:

FIG. 5 is a sectional side elevational view of a radial inflow induction air driven alternator assembly illustrating an axial gap alternator therein;

FIG. 6 is a front elevational view of the radial turbine of FIG. 5;

FIG. 9 is a sectional side elevational view of the radial inflow induction air driven alternator assembly of FIG. 5 illustrating a radial gap alternator therein and having the combined inlet and bypass air control valve of one piece construction and illustrated in a partially open nozzle aperture and bypass fully closed as in an engine idle condition;

FIG. 10 is a sectional front elevational view of a turbine nozzle bypass port of the radial inflow induction air driven alternator assembly of FIG. 9;

FIG. 11 is a sectional front elevational view of the turbine nozzle of FIG. 9 illustrating the turbine nozzle and turbine blade;

FIG. 12 is a sectional side elevational view of the radial inflow induction air driven alternator assembly of FIG. 9 wherein the inlet and bypass air control valve has been rotated 90° and illustrating in a 50% open nozzle aperture and bypass fully closed condition;

FIG. 13 is a sectional front elevational view of the turbine nozzle bypass port of FIG. 12;

FIG. 14 is a sectional front elevational view of the turbine nozzle of FIG. 12 illustrating the turbine nozzle and turbine blade;

FIG. 15 is a sectional side elevational view of the radial inflow induction air driven alternator assembly of FIG. 9 wherein the inlet and bypass air control valve has been rotated 180° from its idle position and illustrating a full nozzle aperture and bypass just beginning to open condition;

Figure 1:
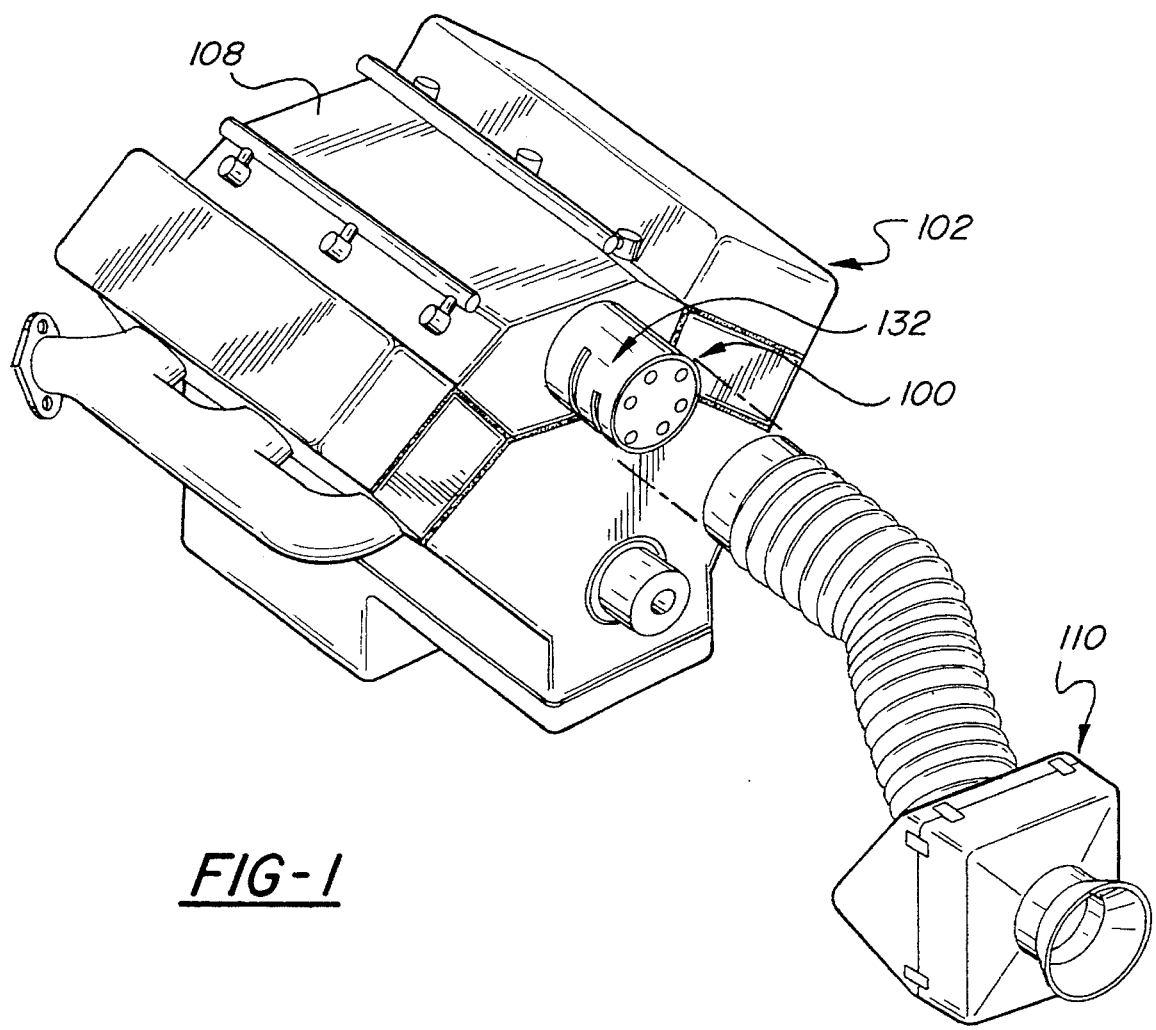
FIG. 1 is a perspective environmental view of a port fuel injected V6 engine having a radial type induction air driven alternator assembly mounted thereon.
Figure 34:
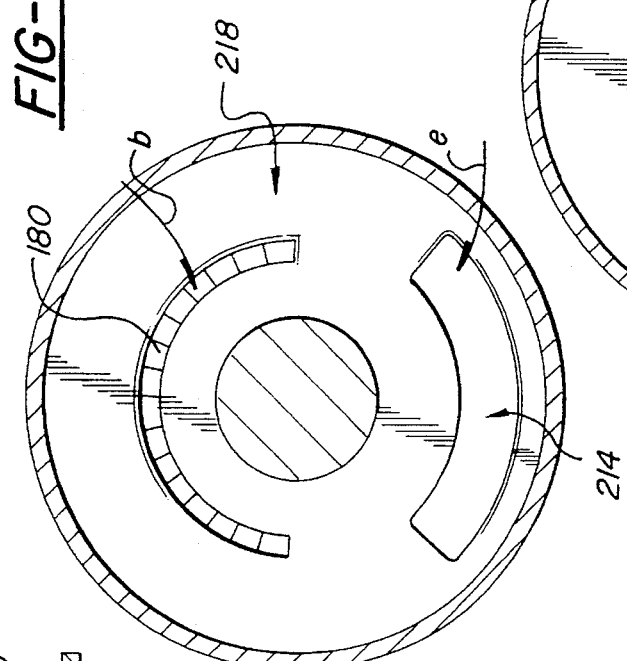
Figure 35:
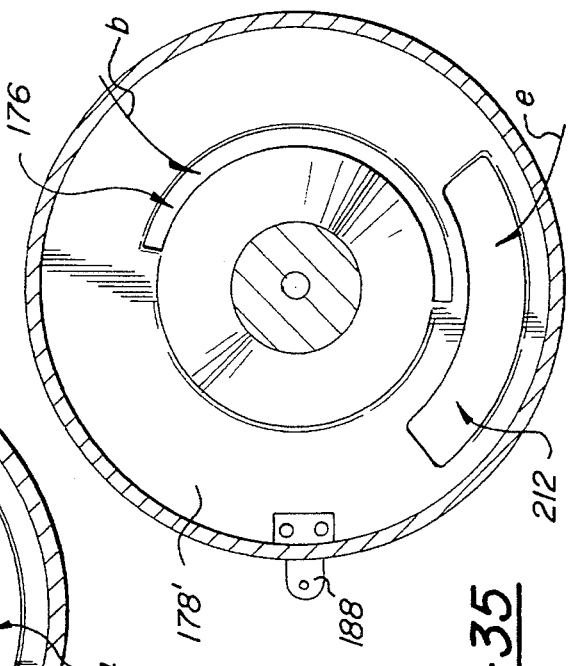
Figure 33:
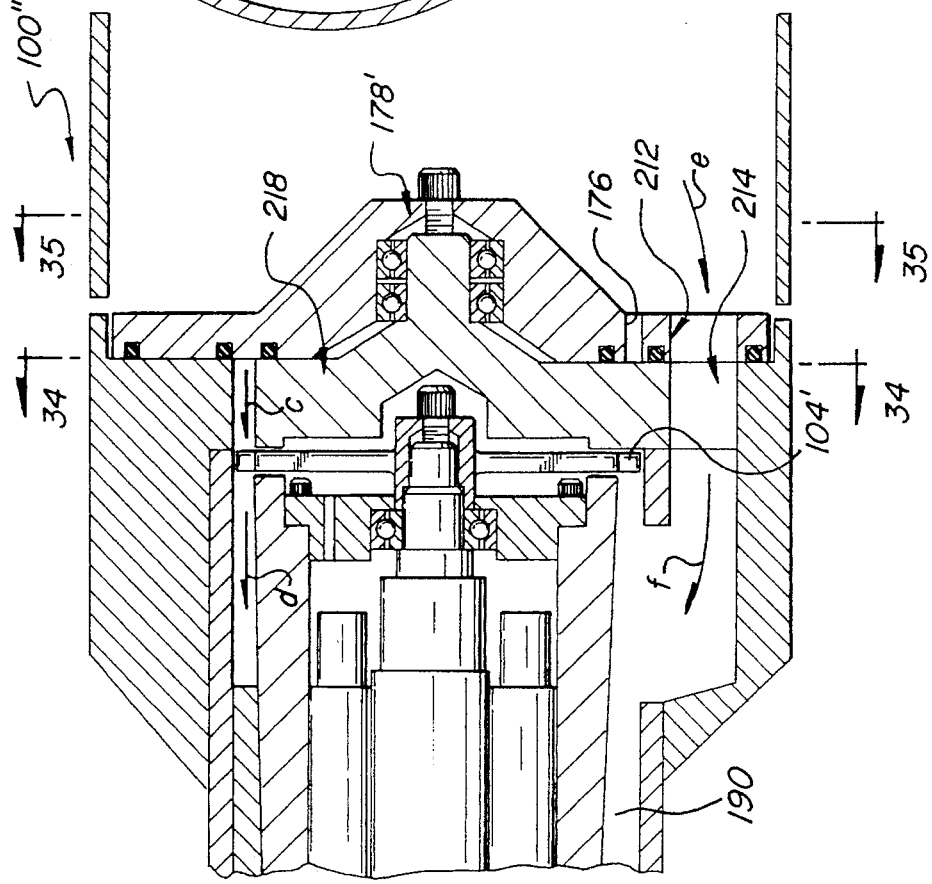
Figure 38:
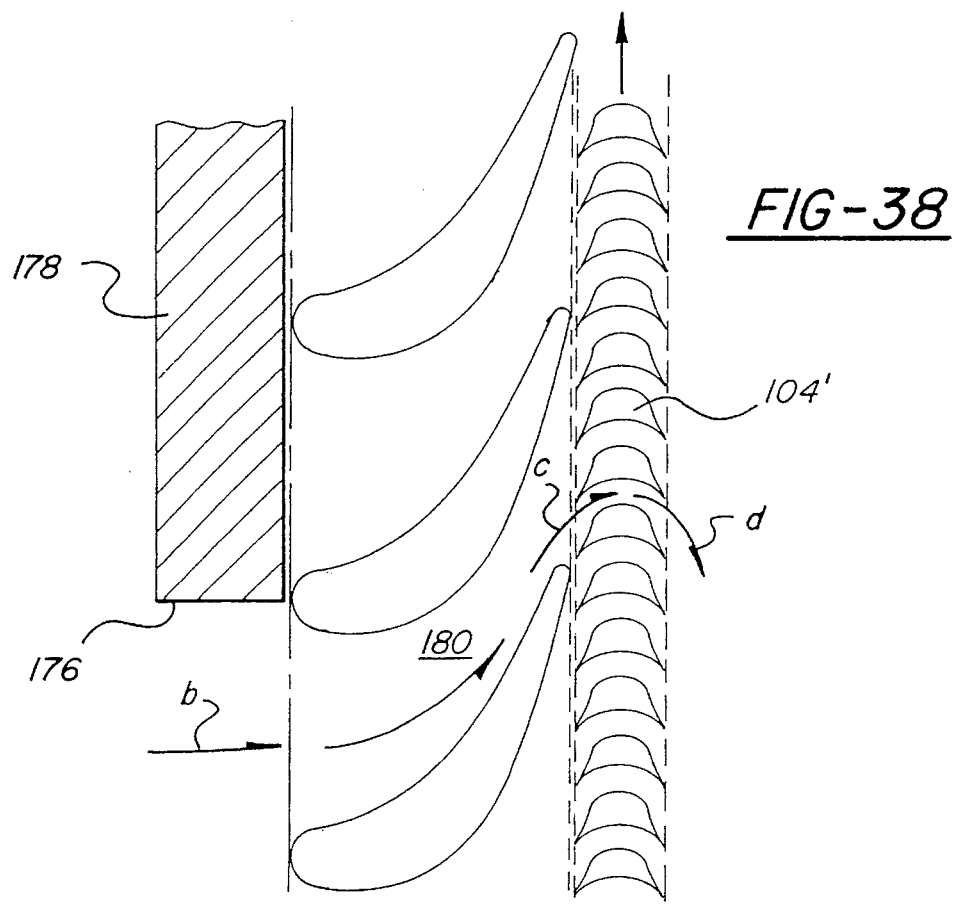
Figure 40:
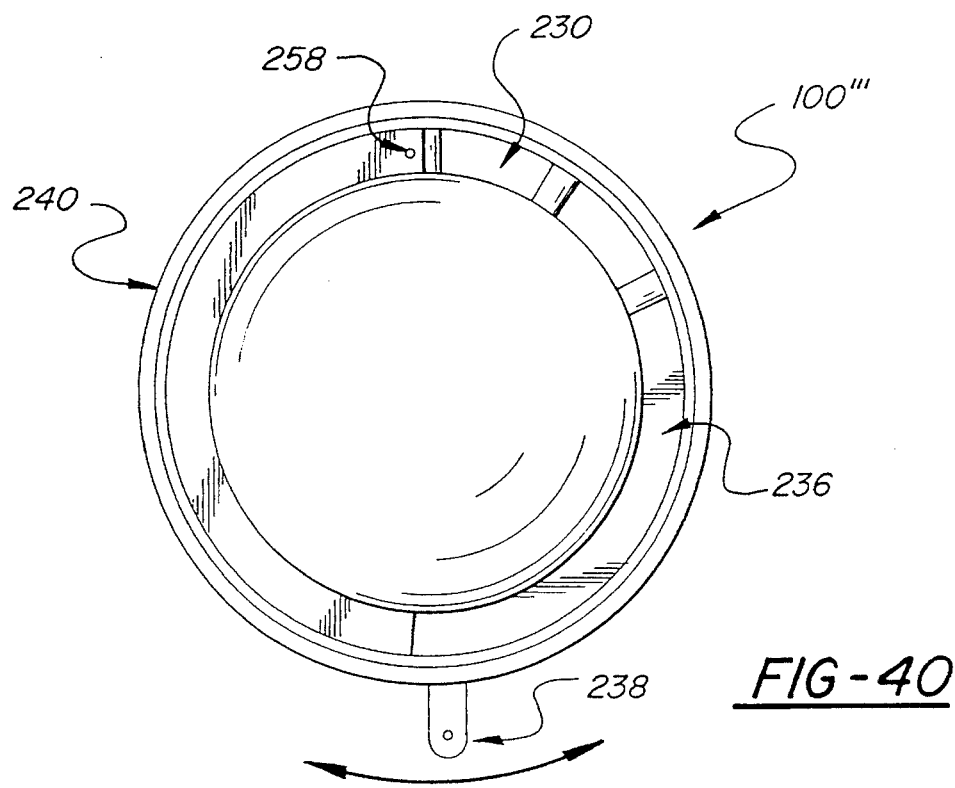
Figure 39:
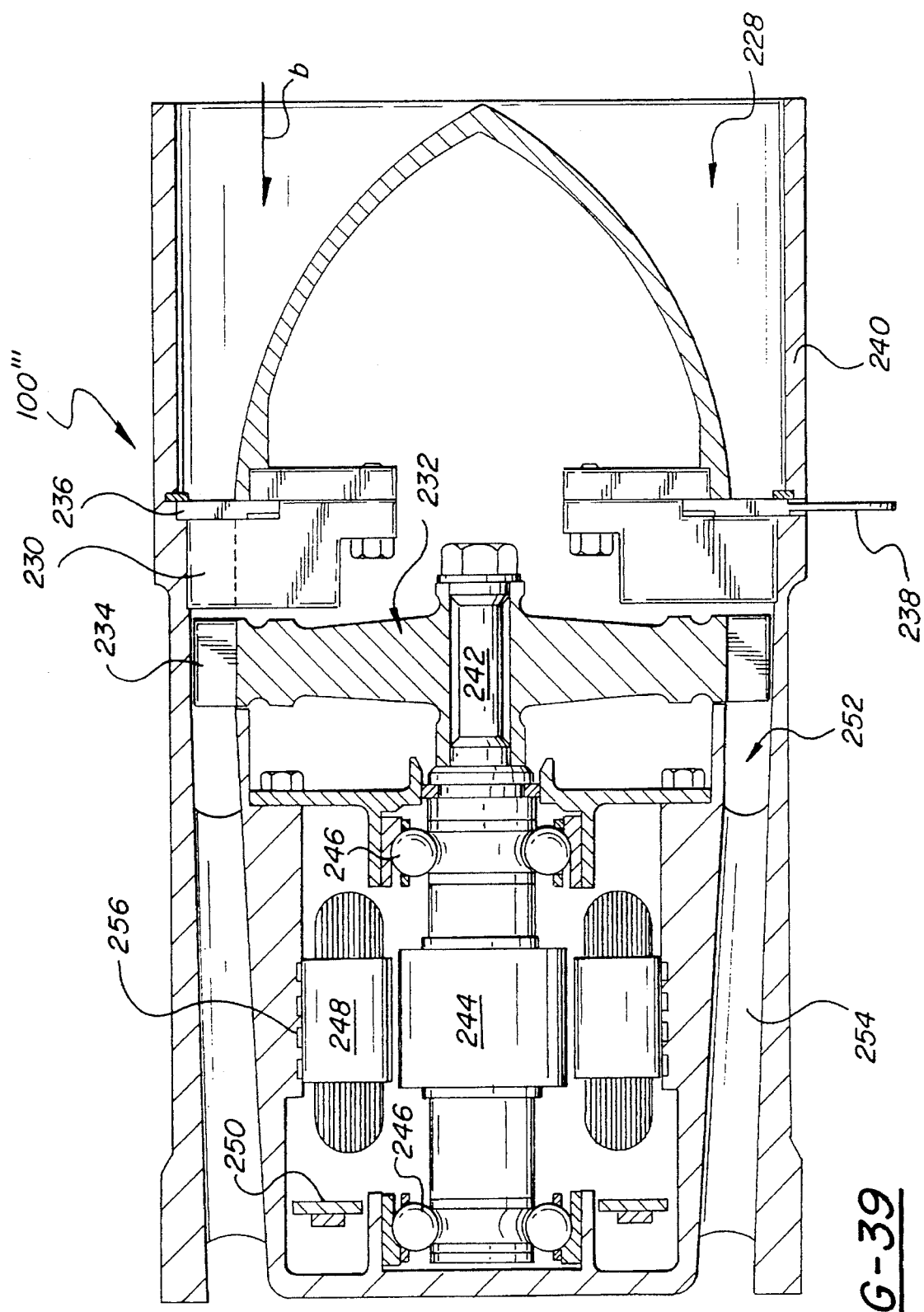
Figure 41:
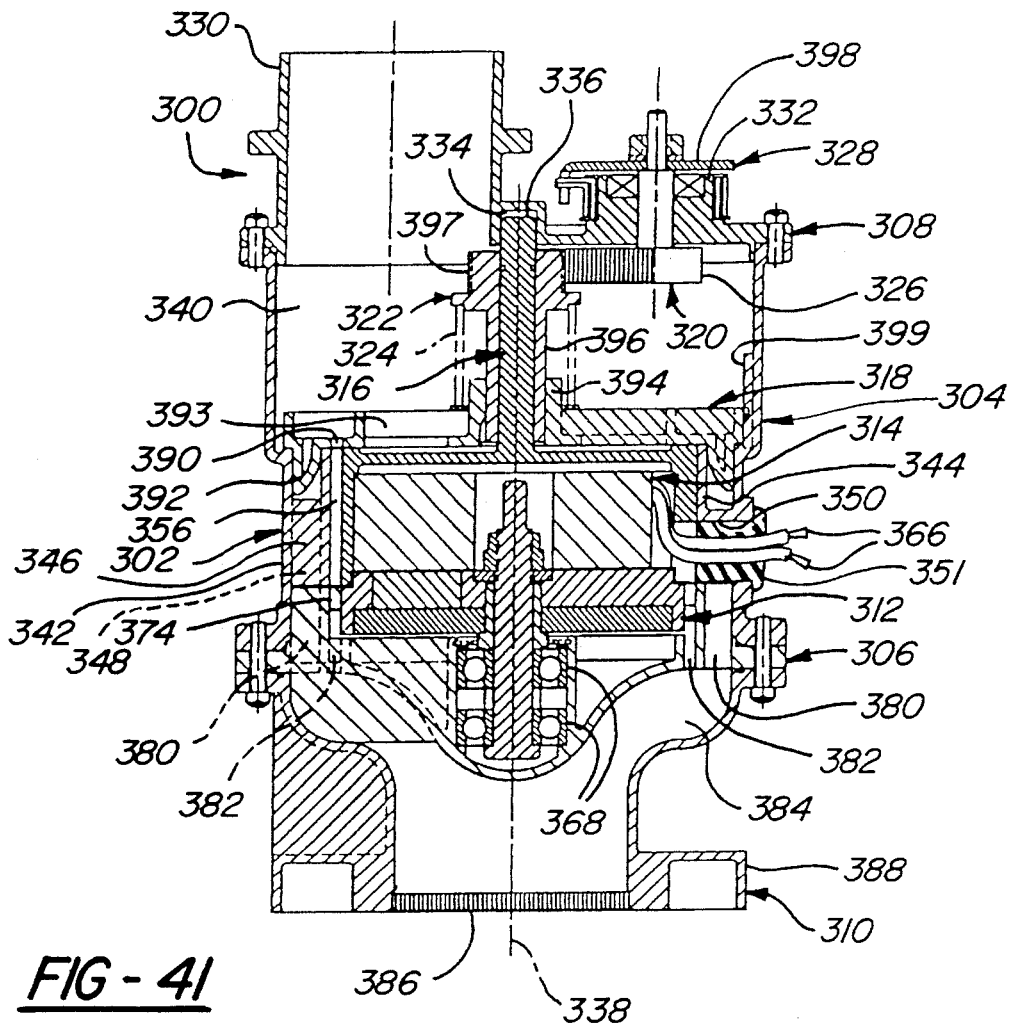
Figure 42:
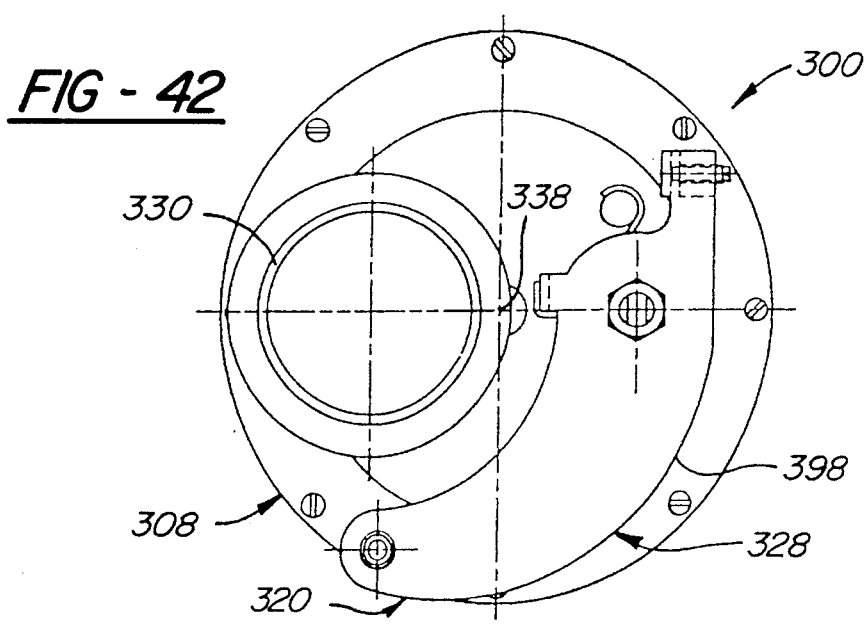
Figure 43:
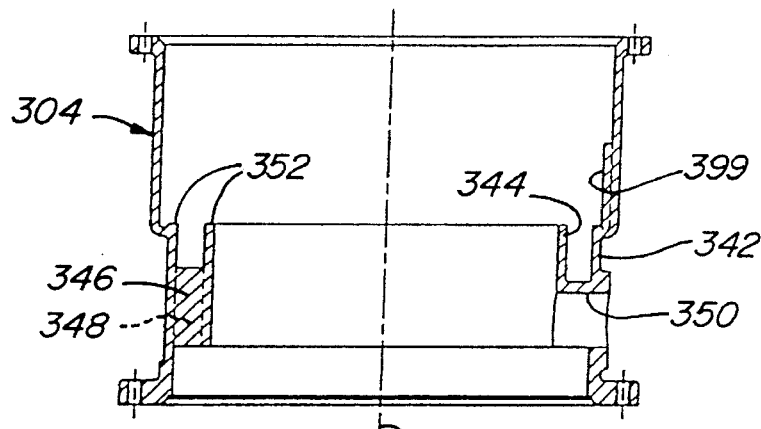
Figure 44:
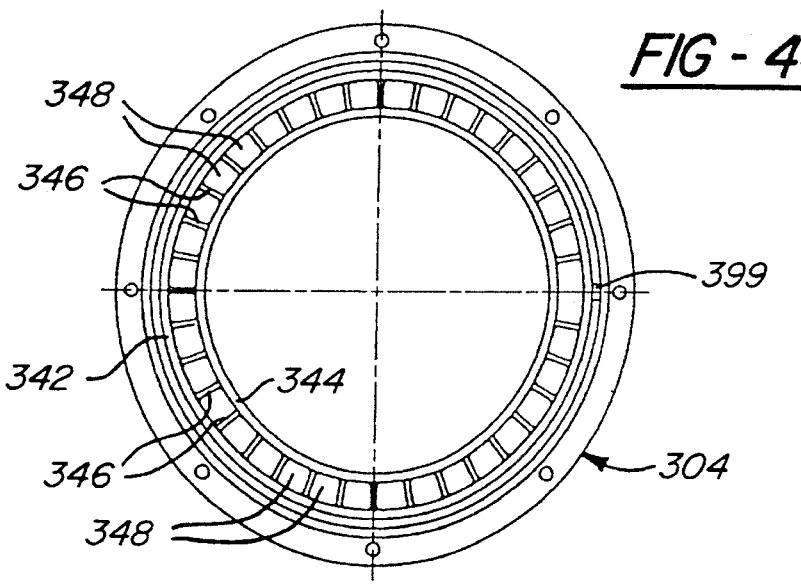
Figure 45:
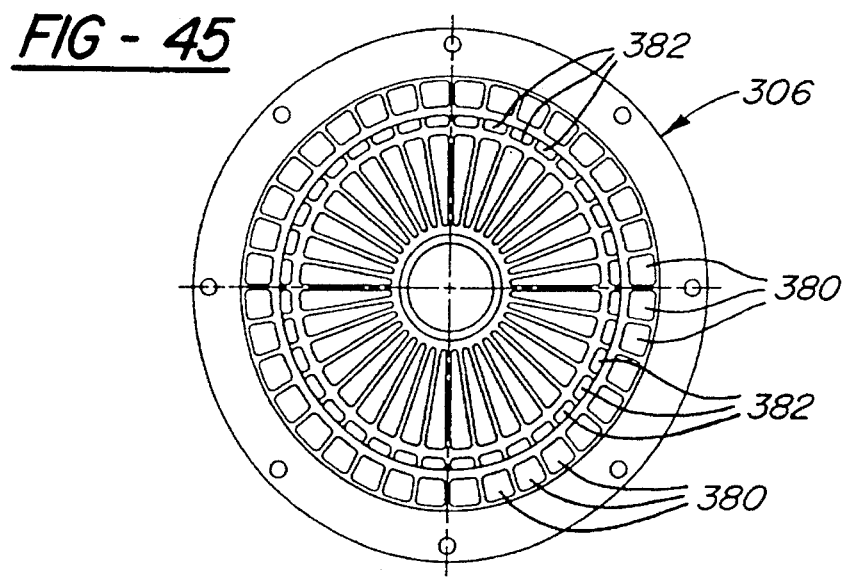
Figure 50:
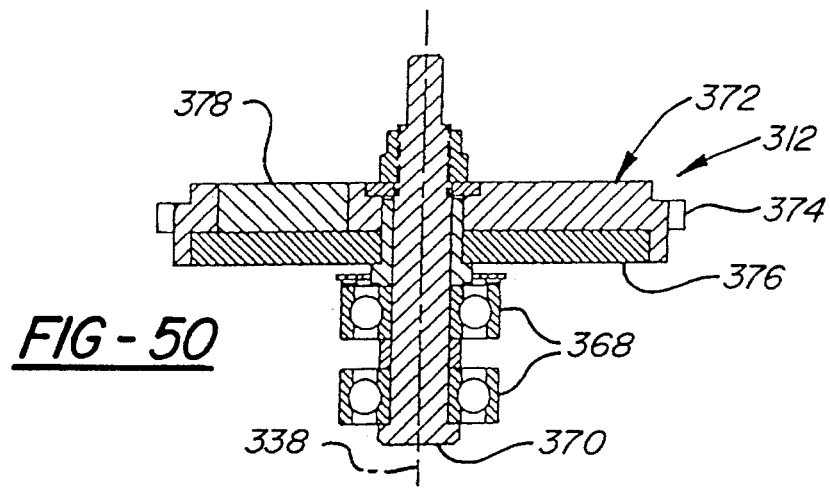
Figure 51:
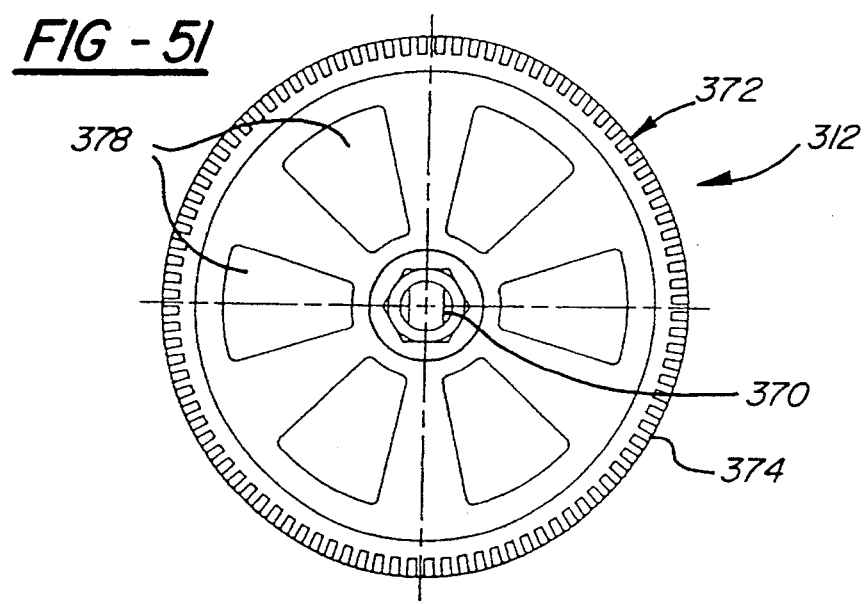
Figure 52:
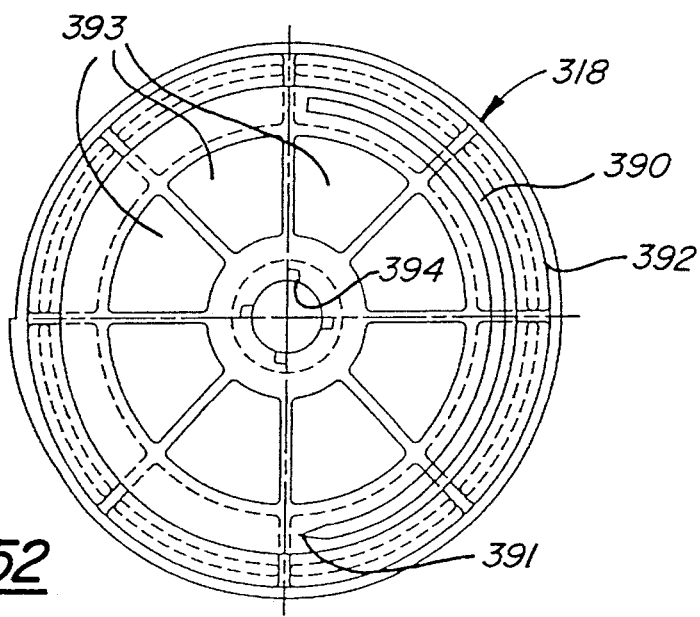
Figure 53:
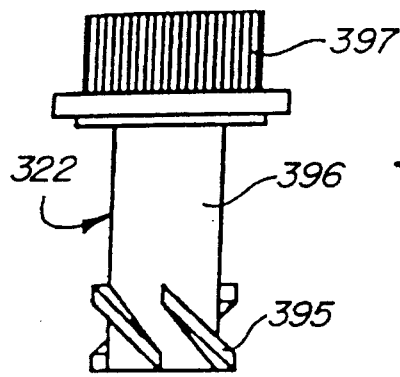
Figure 56:
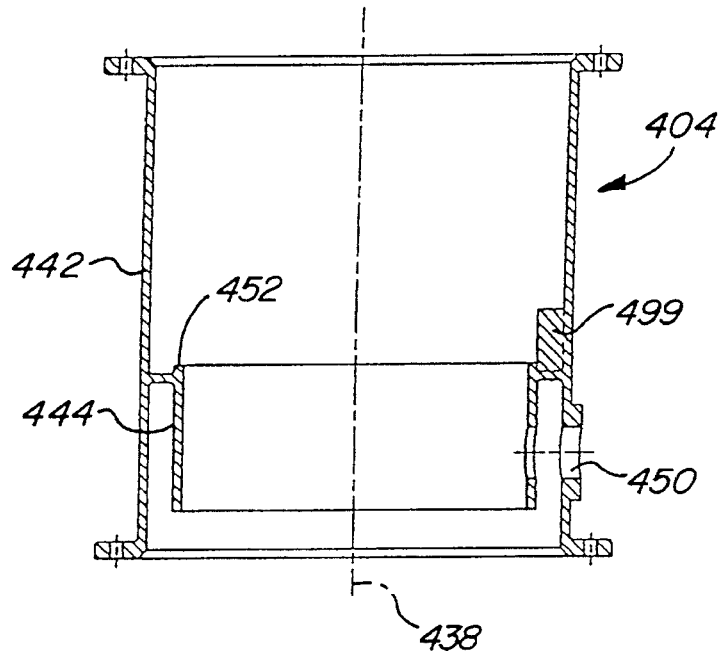
Figure 56A:
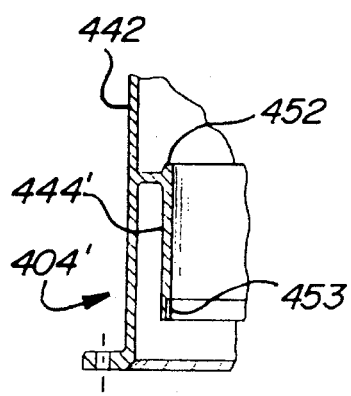
Figure 57:
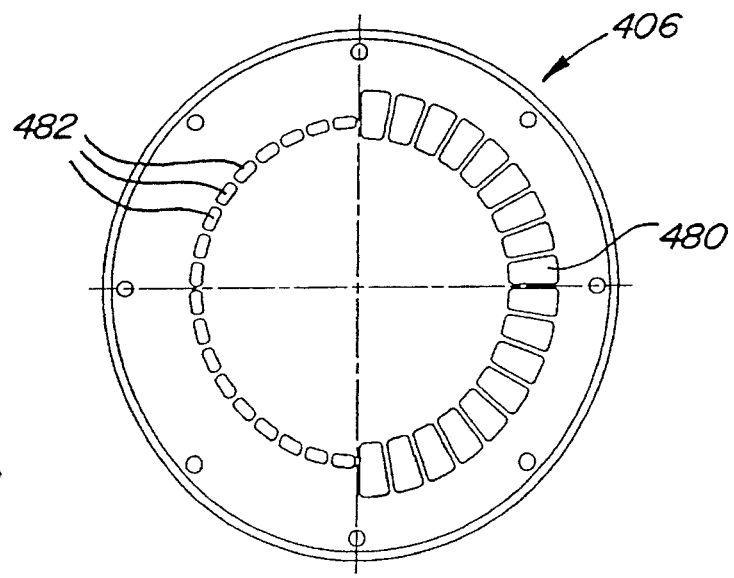
Figure 54:
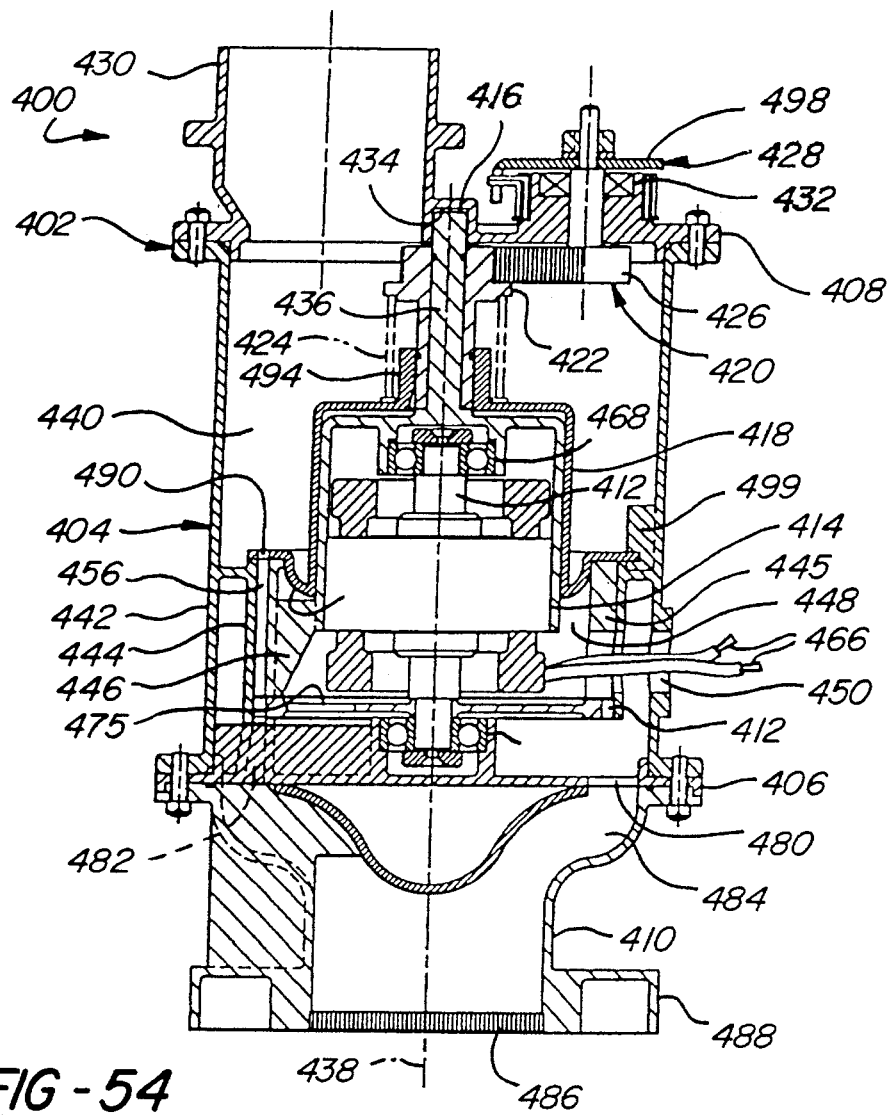
Figure 55:
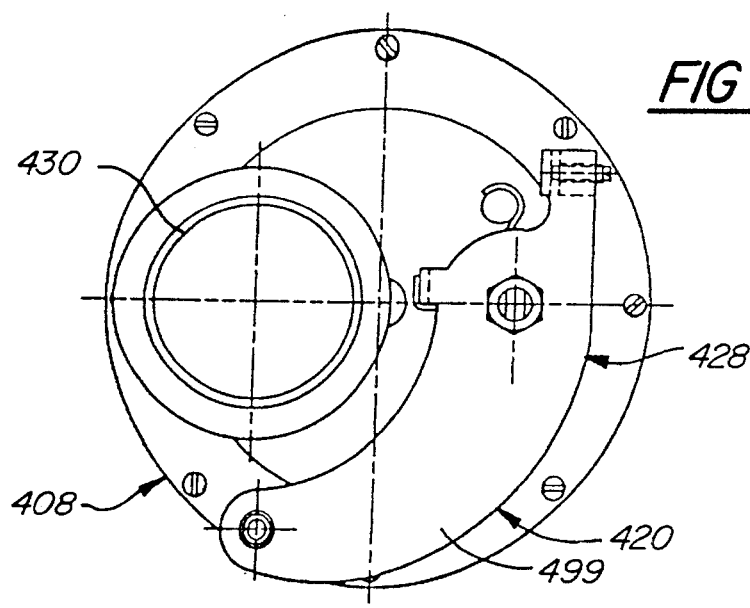
Figure 58:
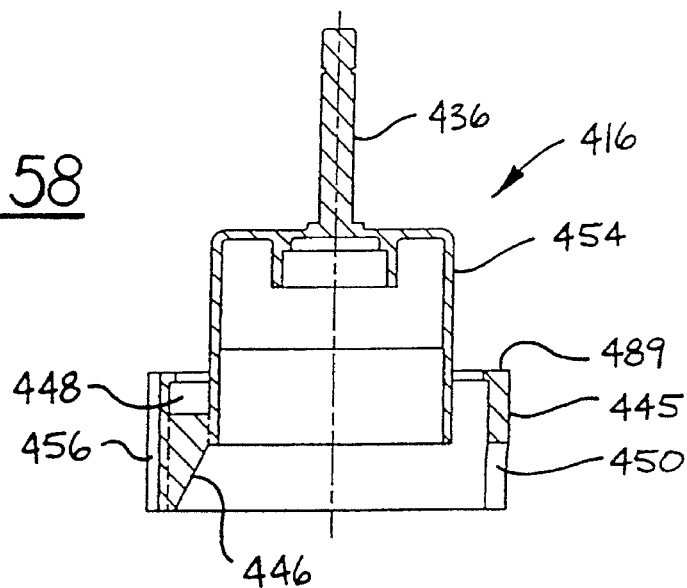
Figure 59:
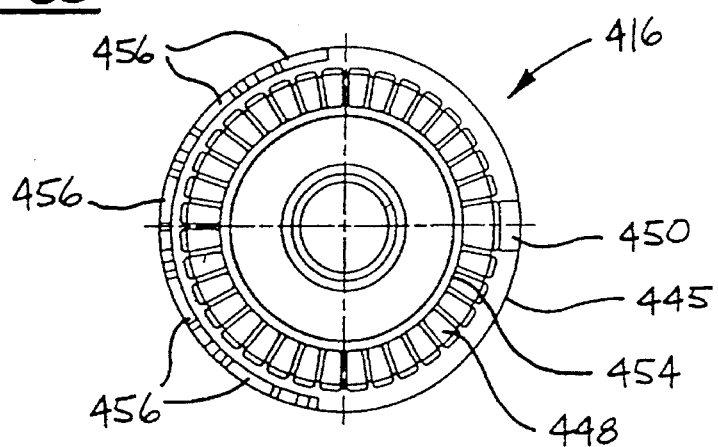
Figure 60:
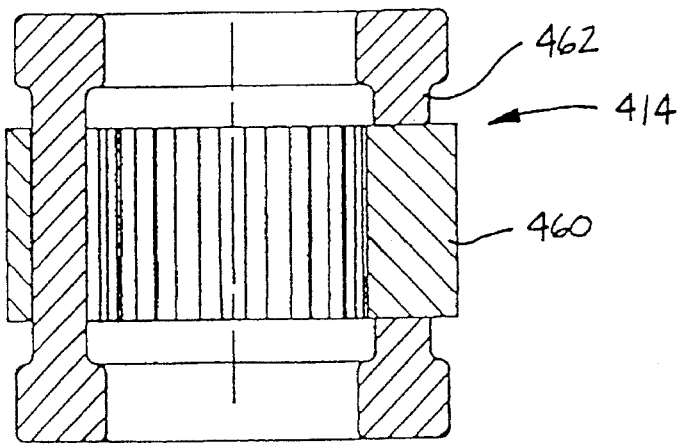
Figure 61:
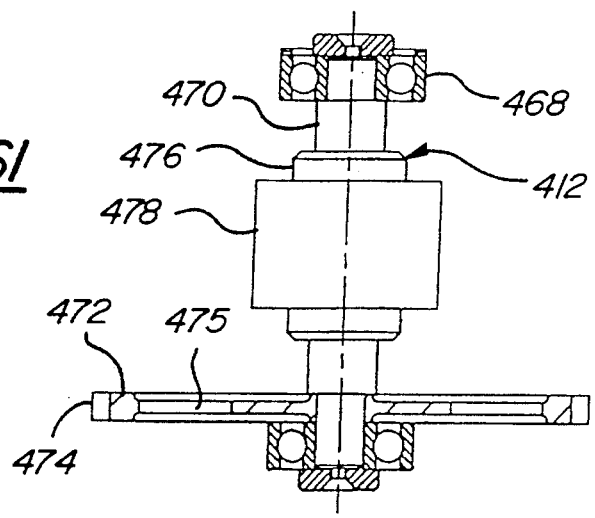
Figure 62:
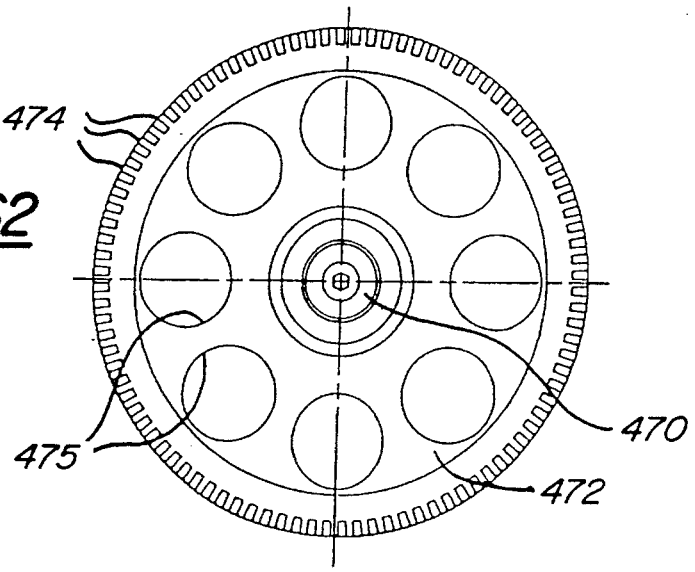
Figure 63:
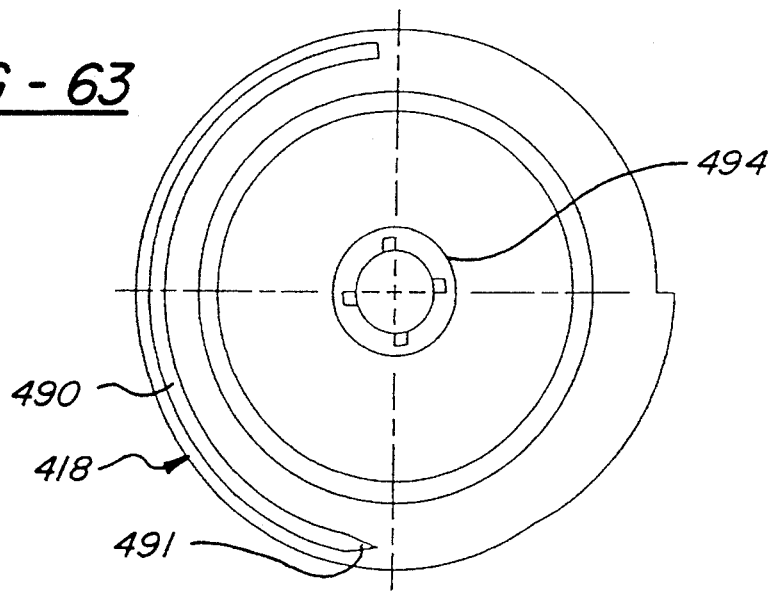
Figure 65:
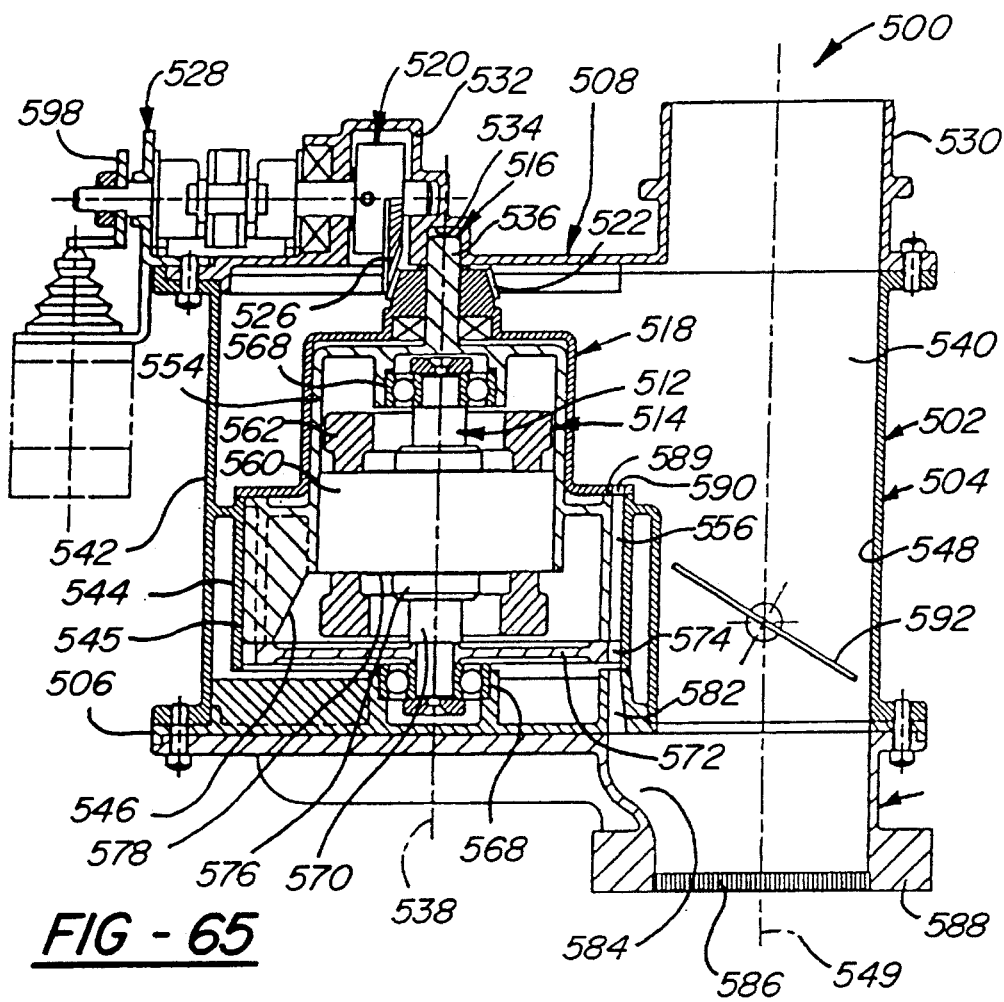
Figure 66:
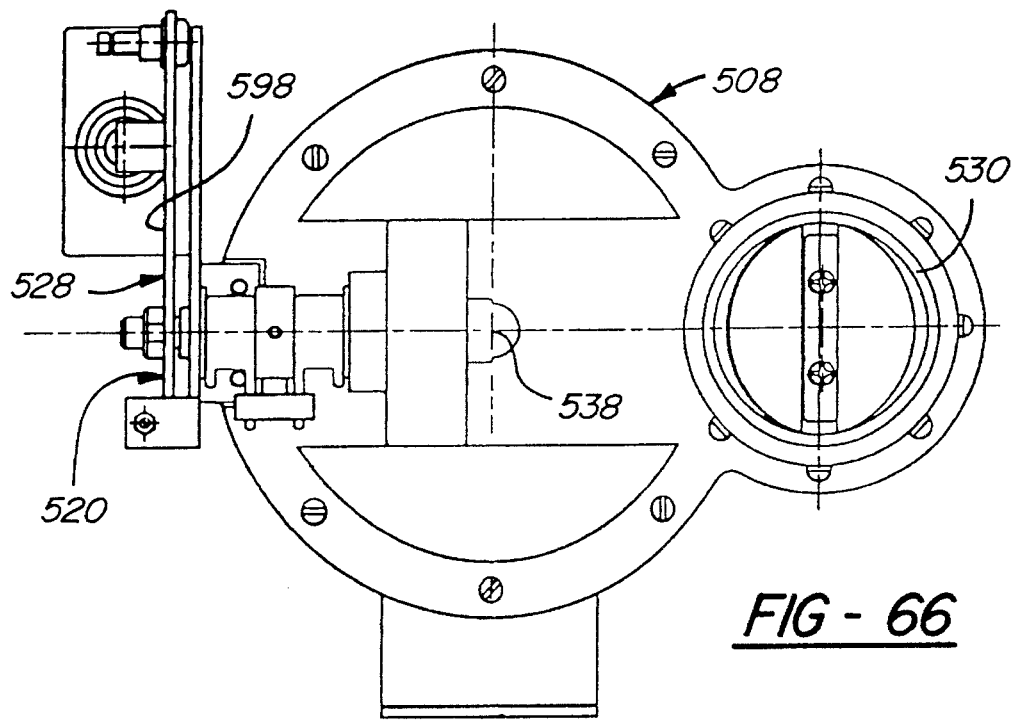
Figure 64:
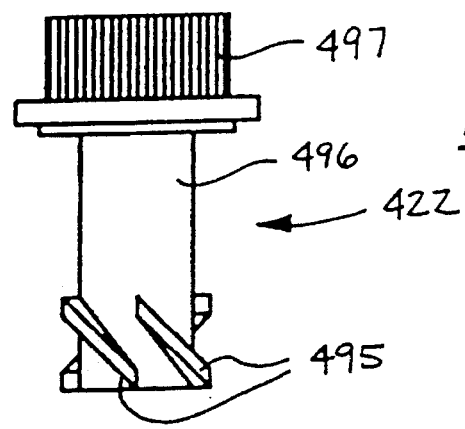
Figure 67:
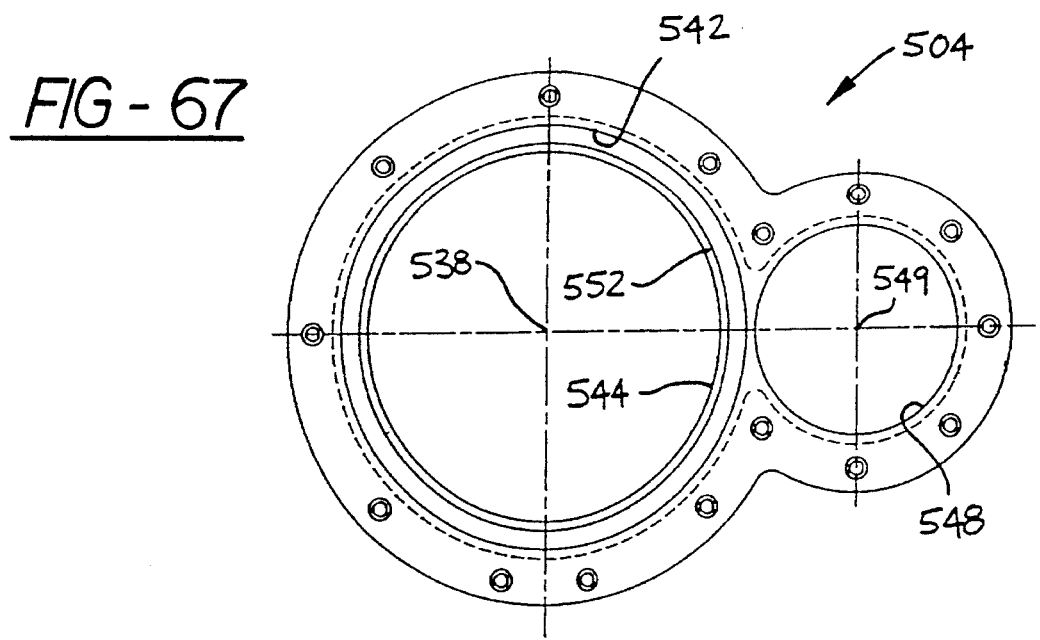
Figure 68:
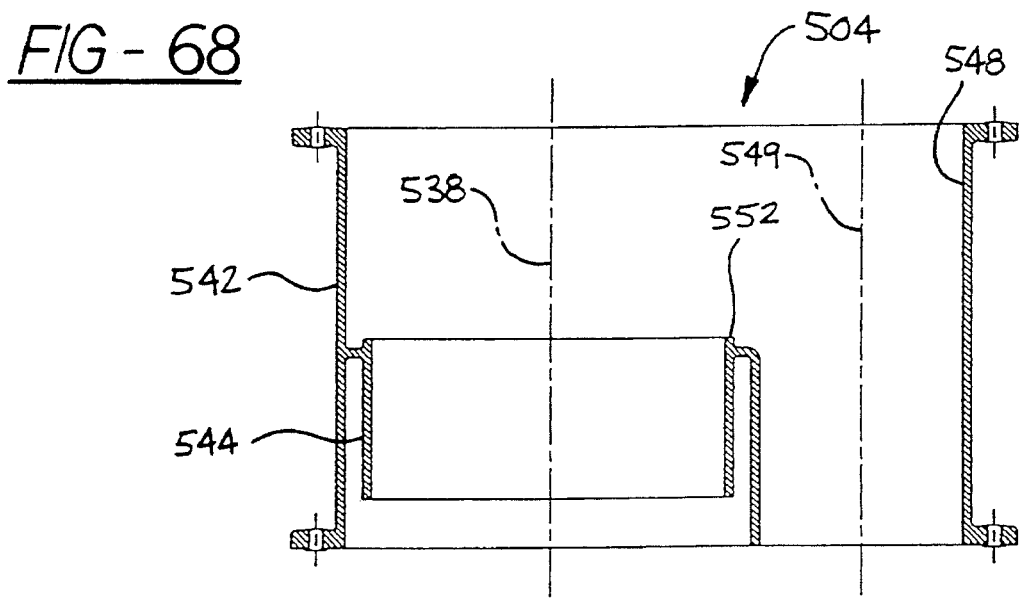
Figure 69:
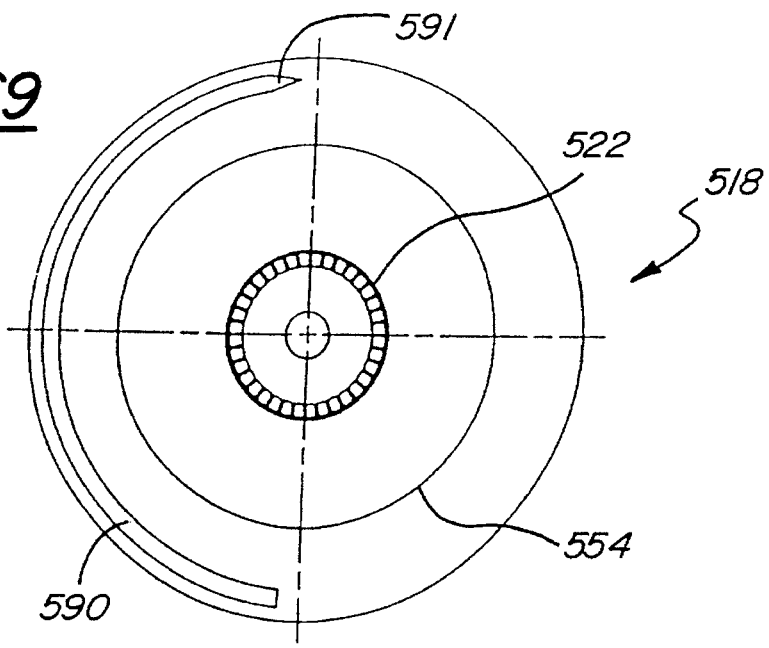
Figure 70:
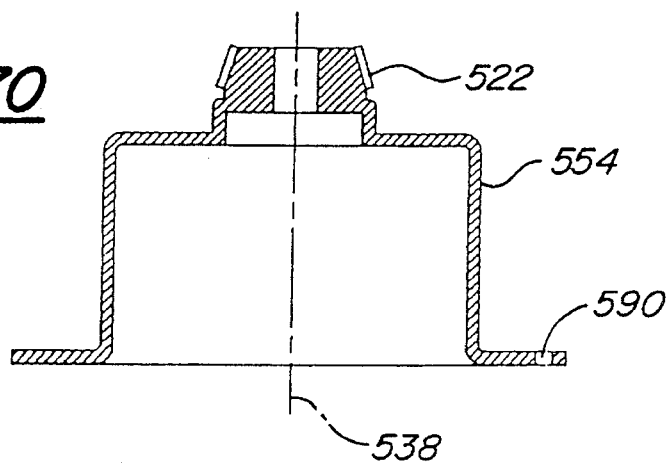
Figure 71:
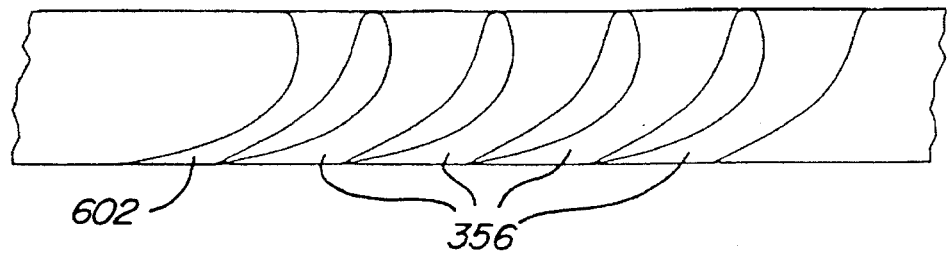
Figure 73:
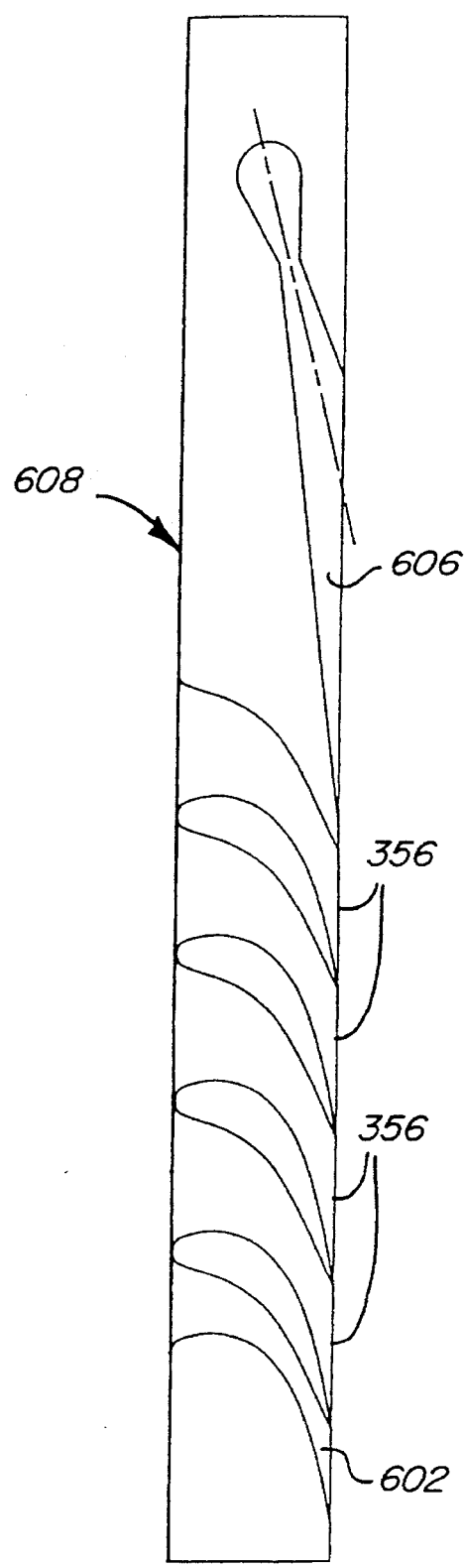
Figure 72:
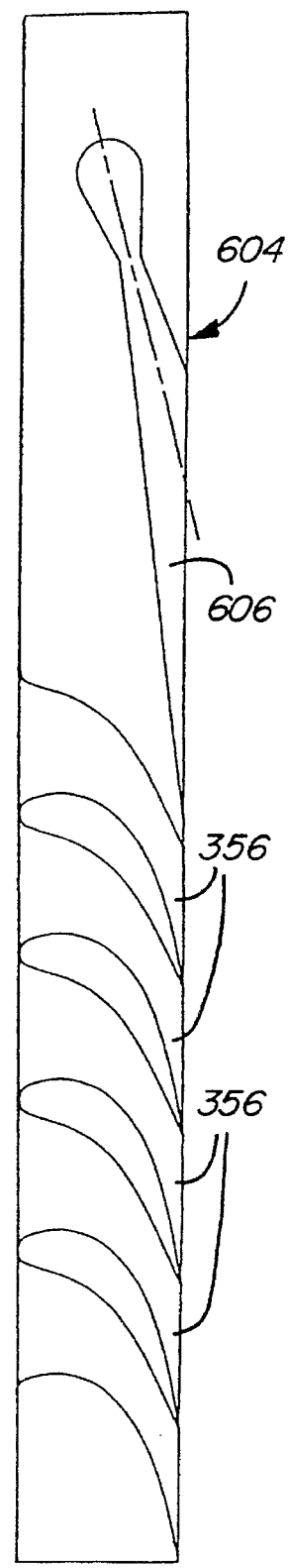
Figure 74:
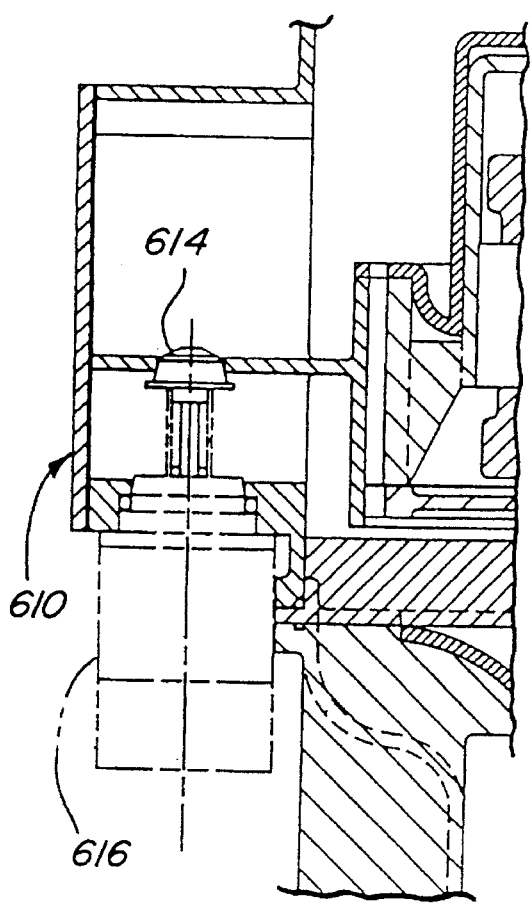
Figure 75:
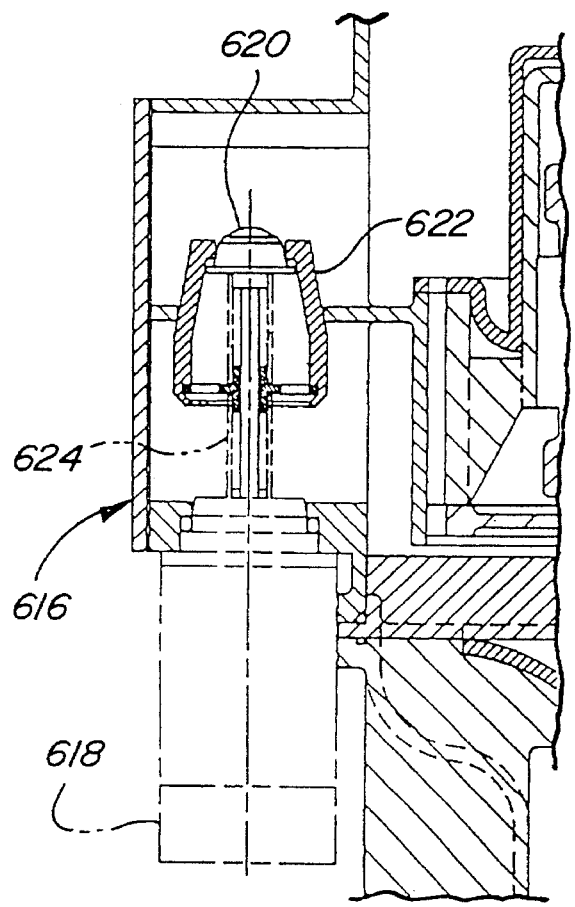
Figure 76:
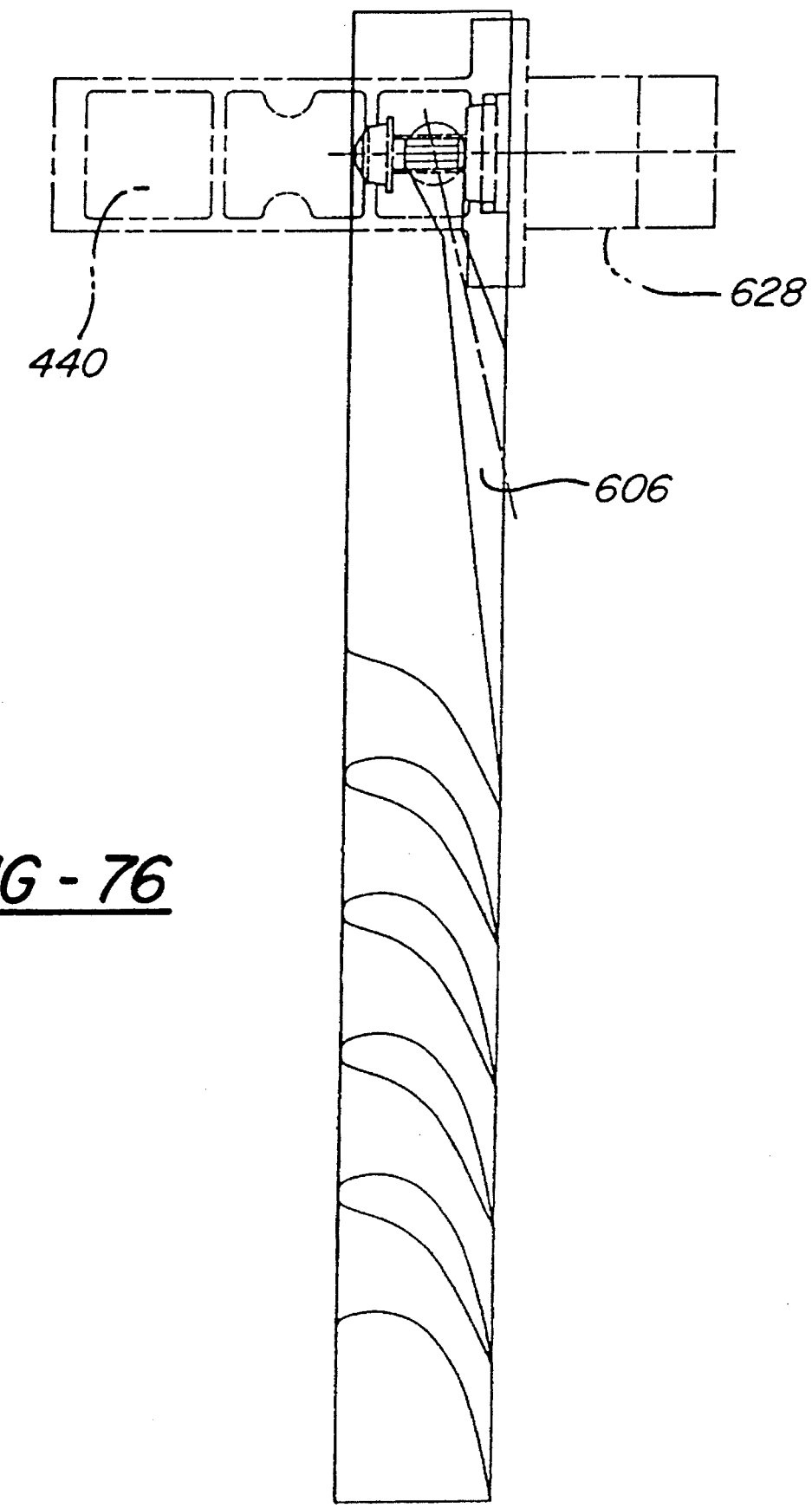
Figure 77A:
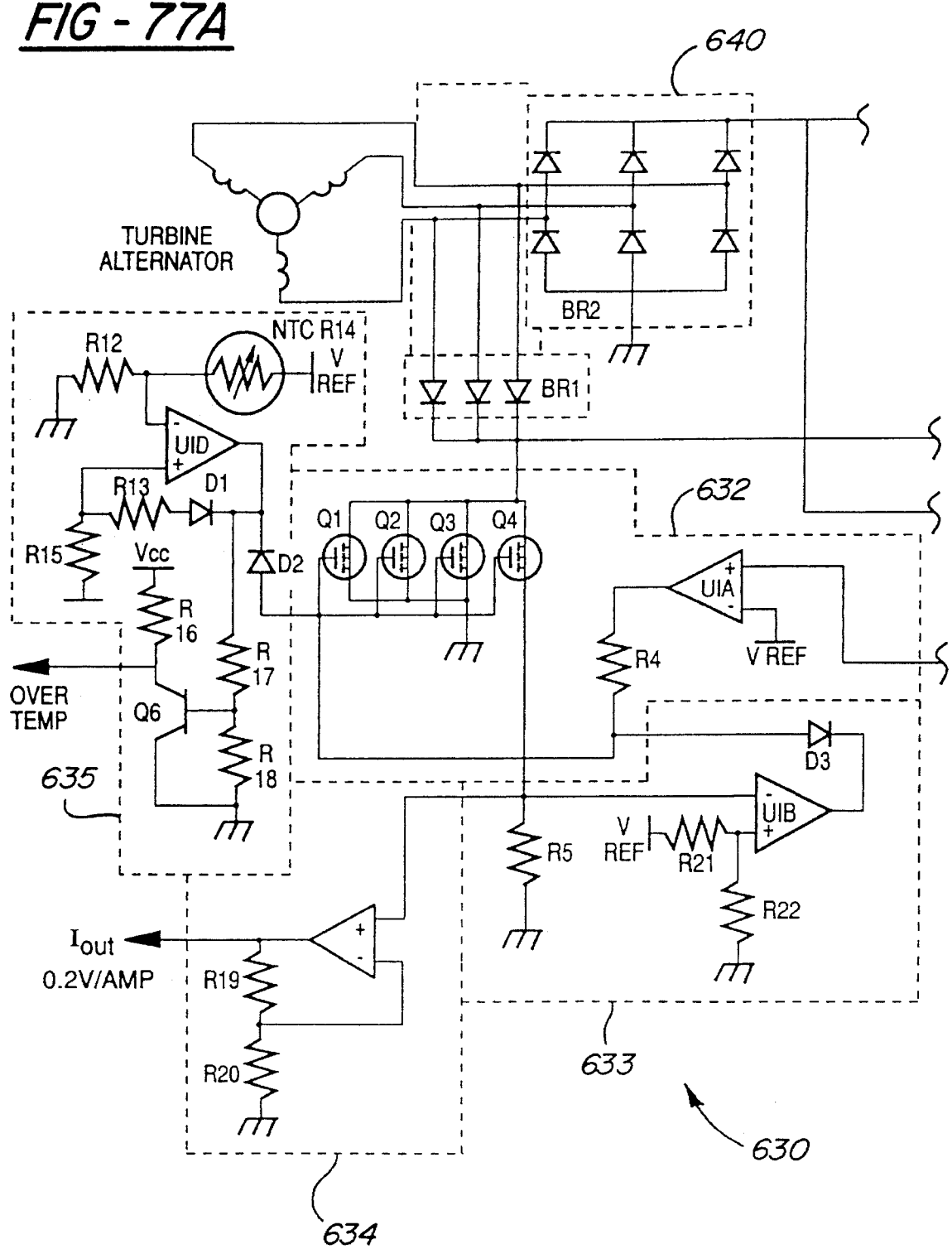
Figure 77B:
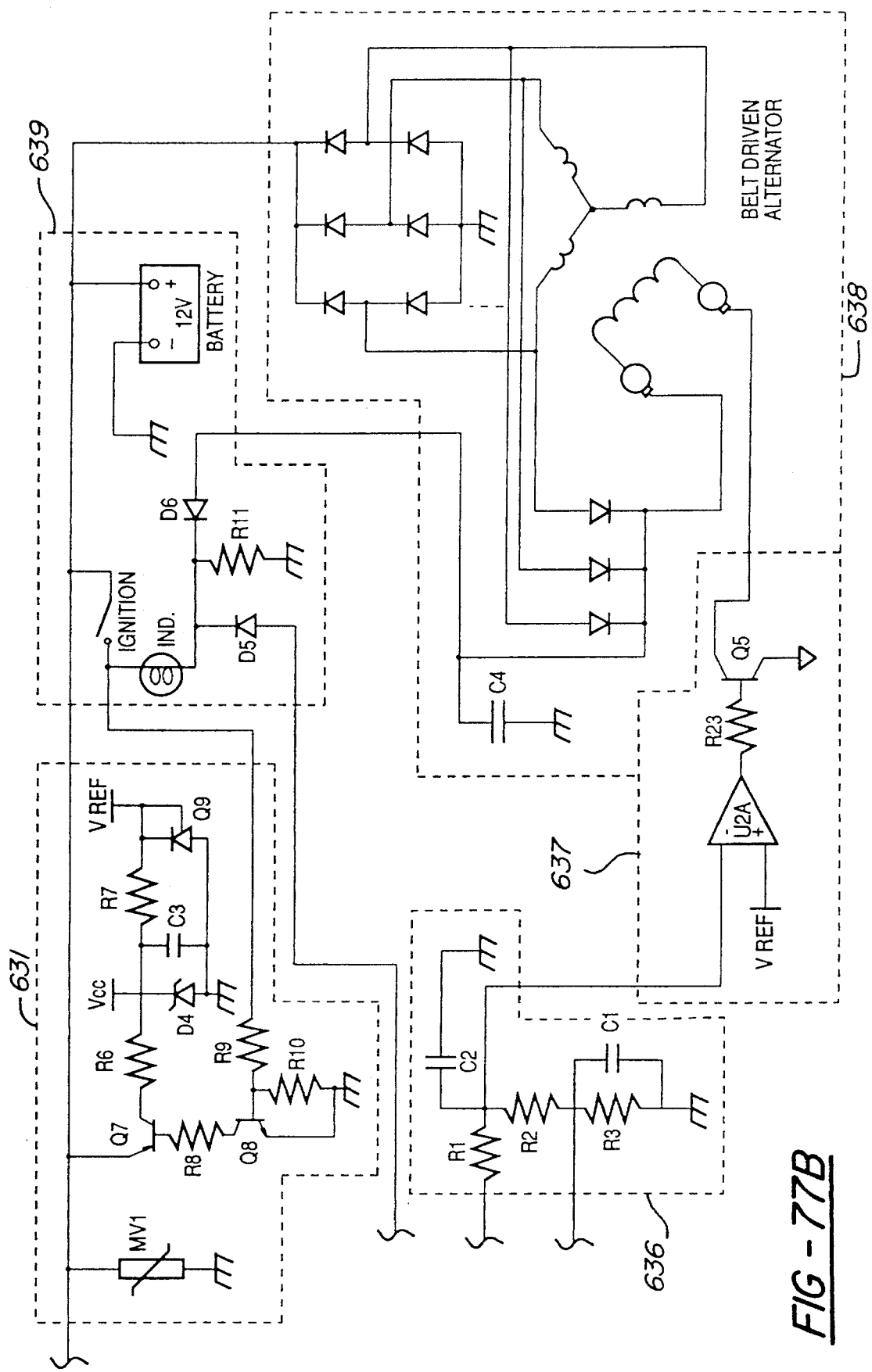

FIG. 16 is a sectional front elevational view of the turbine nozzle bypass port of FIG. 15;

FIG. 17 is a sectional front elevational view of the turbine nozzle of FIG. 15 illustrating the turbine nozzle and turbine blade;

FIG. 18 is a sectional side elevational view of the radial inflow induction air driven alternator assembly of FIG. 9 wherein the inlet and bypass air control valve has been rotated 270° from its idle position and illustrating a 50% open nozzle aperture and bypass fully open as in an engine full throttle condition;

FIG. 19 is a sectional front elevational view of the turbine nozzle bypass port of FIG. 18;

FIG. 20 is a sectional front elevational view of the turbine nozzle of FIG. 18 illustrating the turbine nozzle and turbine blade;

FIG. 21 is a sectional side elevational view of a radial inflow induction air driven alternator assembly including a radial gap alternator therein illustrating a stepper motor drive for actuating the inlet and bypass air control valve;

FIG. 22 is a sectional side elevational view of an axial inflow induction air driven alternator assembly constructed in accordance with an alternative embodiment of the invention;

FIG. 23 is a front elevational view of the axial inflow induction air driven alternator of FIG. 22 illustrating an inlet air regulator defined by a moveable nozzle aperture control disc;

FIG. 24 is a sectional side elevational view of an axial inflow induction air driven alternator assembly including an integral bypass for bypassing the turbine and having a combined inlet and bypass air regulator defined by a moveable aperture control disc illustrating a partially open nozzle aperture and bypass fully closed as in an engine idle condition;

FIG. 25 is a sectional front elevational view of the turbine nozzle entrance plane of the axial induction air driven alternator assembly of FIG. 24;

FIG. 26 is a sectional front elevational view of a plane just upstream of an aperture plate in the axial inflow induction air driven alternator assembly of FIG. 24;

FIG. 27 is a sectional side elevational view of the axial inflow induction air driven alternator assembly of FIG. 24 illustrating a 50% open nozzle aperture and bypass fully closed condition;

FIG. 28 is a sectional front elevational view of the turbine nozzle entrance plane of the axial induction air driven alternator assembly of FIG. 27;

FIG. 29 is a sectional front elevational view of the plane just upstream of the aperture plate in the axial inflow induction air driven alternator assembly of FIG. 27;

FIG. 30 is a sectional side elevational view of the axial inflow induction air driven alternator assembly of FIG. 24 illustrating a fully open nozzle aperture and bypass beginning to open condition;

FIG. 31 is a sectional front elevational view of the turbine nozzle entrance plane of the axial inflow induction air driven alternator assembly of FIG. 30;

FIG. 32 is a sectional front elevational view of the plane just upstream of the aperture plate in the axial inflow induction air driven alternator assembly of FIG. 30;

FIG. 33 is a sectional side elevational view of the axial inflow induction air driven alternator assembly of FIG. 24 illustrating a 50% open nozzle aperture and bypass fully open as in an engine full throttle condition;

FIG. 34 is a sectional front elevational view of the turbine nozzle entrance plane of the axial inflow induction air driven alternator assembly of FIG. 33;

FIG. 35 is a sectional front elevational view of the plane just upstream of the aperture plate in the axial inflow induction air driven alternator assembly of FIG. 33;

FIG. 36 is a sectional side elevational view of the axial inflow induction air driven alternator assembly of FIG. 24 illustrated with an electro-mechanical stepper motor drive for operating the integral inlet and bypass air control disc;

FIG. 37 is another sectional front elevational view of the axial inflow induction air driven alternator assembly of FIG. 24 illustrating the air flow path through the outer housing;

FIG. 38 is a schematic illustration of the turbine nozzle and turbine blades of the axial inflow induction air driven alternator assembly of FIG. 24 illustrating the air flow through the nozzle and blades;

FIG. 39 is a sectional side elevational view of an alternative axial inflow induction air driven alternator assembly illustrating a three phase rectifier assembly mounted internally to the alternator housing; and FIG. 40 is a front elevational view of an alternative nozzle arrangement for the axial inflow induction air driven alternator assembly illustrated in FIG. 39 illustrating additional metering ports through a nozzle plate;

FIG. 41 is an axial cross-sectional view of a first modified embodiment having outer coaxial bypass flow and an axial gap alternator;

FIG. 42 is an inlet end view of the embodiment of FIG. 41 showing the cover;

FIG. 43 is an axial cross-sectional view of the main housing of the embodiment of FIG. 41;

FIG. 44 is an inlet end view of the housing of FIG. 43;

FIG. 45 is an inlet end view of the end cap of the embodiment of FIG. 41;

FIG. 46 is an axial cross-sectional view of the nozzle member of the embodiment of FIG. 41;

FIG. 47 is an outlet end view of the nozzle member of FIG. 46;

FIG. 48 is an unrolled outer peripheral view of the nozzles in the nozzle member of FIGS. 46 and 47;

FIG. 49 is an end view of the stator of the embodiment of FIG. 41;

FIG. 50 is an axial cross-sectional view of the rotor of the embodiment of FIG. 41;

FIG. 51 is an inlet end view of the rotor of FIG. 50;

FIG. 52 is an outlet end view of the flow control valve of the embodiment of FIG. 41;

FIG. 53 is a side view of the drive sleeve of the embodiment of FIG. 41;

FIG. 54 is an axial cross-sectional view of a second modified embodiment having inner coaxial bypass flow and a radial gap alternator;

FIG. 55 is an inlet end view of the embodiment of FIG. 54 showing the cover;

FIG. 56 is an axial cross-sectional view of the main housing of the embodiment of FIG. 54;

FIG. 56A is a fragmentary cross-sectional view showing a modified embodiment of the main housing of FIG. 56 to include a plastic ring insert;

FIG. 57 is an outlet end view of the end cap of the embodiment of FIG. 54;

FIG. 58 is an axial cross-sectional view of the nozzle member of the embodiment of FIG. 54;

FIG. 59 is an outlet end view of the nozzle member of FIG. 54;

FIG. 60 is an axial cross-sectional view of the stator of the embodiment of FIG. 54;

FIG. 61 is a side view of the rotor of the embodiment of FIG. 54;

FIG. 62 is an outlet end view of the rotor of FIG. 61;

FIG. 63 is an inlet end view of the flow control valve of the embodiment of FIG. 54;

FIG. 64 is a side view of the drive sleeve of the embodiment of FIG. 54;

FIG. 65 is an axial cross-sectional view of a third modified embodiment having parallel bypass flow and a radial gap alternator;

FIG. 66 is an inlet end view of the embodiment of FIG. 65 showing the cover;

FIG. 67 is an inlet end view of the main housing of the embodiment of FIG. 65;

FIG. 68 is an axial cross-sectional view of the main housing of FIG. 67;

FIG. 69 is an inlet end view of the flow control valve of the embodiment of FIG. 65;

FIG. 70 is an axial cross-sectional view of the control valve of FIG. 69;

FIG. 71 is a flattened peripheral view of a first optional nozzle variation;

FIG. 72 is a flattened peripheral view of a second optional nozzle variation;

FIG. 73 is a flattened peripheral view of a third optional nozzle variation;

FIG. 74 is a cross-sectional view of an optional bypass idle air control valve mounting;

FIG. 75 is a cross-sectional view of an optional combination idle bypass and turbine power control bypass valve mounting;

FIG. 76 is a flattened peripheral view showing an idle air control valve applied to the hidden nozzle of a nozzle arrangement similar to FIG. 72; and FIGS. 77A and 77B comprise a schematic diagram of an electronic battery charging system circuit and turbine regulator.

DETAILED DESCRIPTION OF THE INVENTION

Referring to FIGS. 1 through 4a, an induction air driven alternator assembly 100, 100', 100", 100''' is described for use with a modern port fuel injected internal combustion engine 102. The alternator assembly 100, 100', 100", 100''' replaces a conventional variable air intake or throttle body and defines the engine 102 power control. As is hereinafter more fully described, the induction air driven alternator assembly 100, 100', 100", 100''' includes and is driven by a turbine assembly 104, 104' of radial or axial design interposed in the engine air intake. The turbine assembly 104, 104' converts the change in kinetic energy in the air flow across the engine power control into rotational motion which drives an electrical current generator 106 or alternator to produce electrical current. This current is used to supplement a conventional vehicle charging system as is more fully herein described.

As illustrated in FIG. 1, the modern port fuel injected V6 engine 102 includes an intake manifold 108 in communication with an air filter and enclosure assembly 110 through which inlet or combustion air is communicated into the engine. Interposed between the intake manifold 108 and air filter assembly 110 is the induction air driven alternator assembly 100. Assembly 100 includes a turbine assembly 104 of radial design illustrated in FIGS. 5,6 and 9–21.

Figure 2:
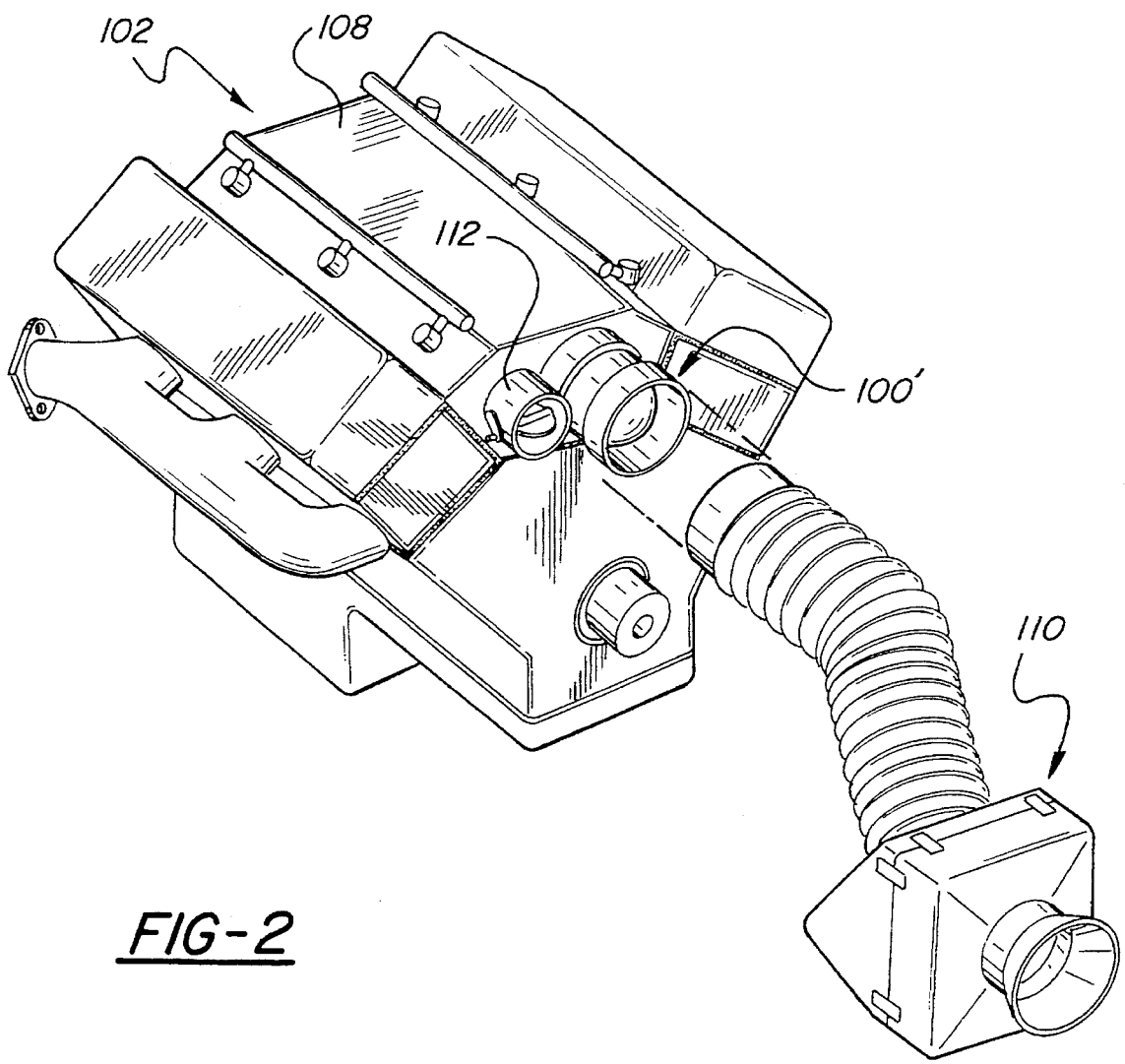
FIG. 2 is a perspective environmental view of a port fuel injected V6 engine having an axial type induction air driven alternator assembly mounted thereon.

In FIG. 2, the modern port fuel injected V6 engine 102 includes an alternative induction air driven alternator assembly 100', 100 ", 100'''. Alternator assembly 100', 100", 100''' includes a turbine assembly 104' of axial design. Like the alternator assembly 100 of FIG. 1, alternator assembly 100', 100", 100''' is mounted on an intake manifold 108. In the configuration illustrated in FIG. 2, an independent bypass valve 112 of butterfly construction is also mounted on intake manifold 108 and independently communicates combustion air into engine 102. Bypass valve 112 functions in a parallel relationship with alternator assembly 100', 100''' and is used when the alternator assembly 100, 100" includes no independent bypass means for bypassing the turbine assembly 104, 104' from inlet air. Bypass valve 112 can be controlled by the alternator assembly 100', 100''' through linkages or alternatively it can be independently controlled.

Figure 3:
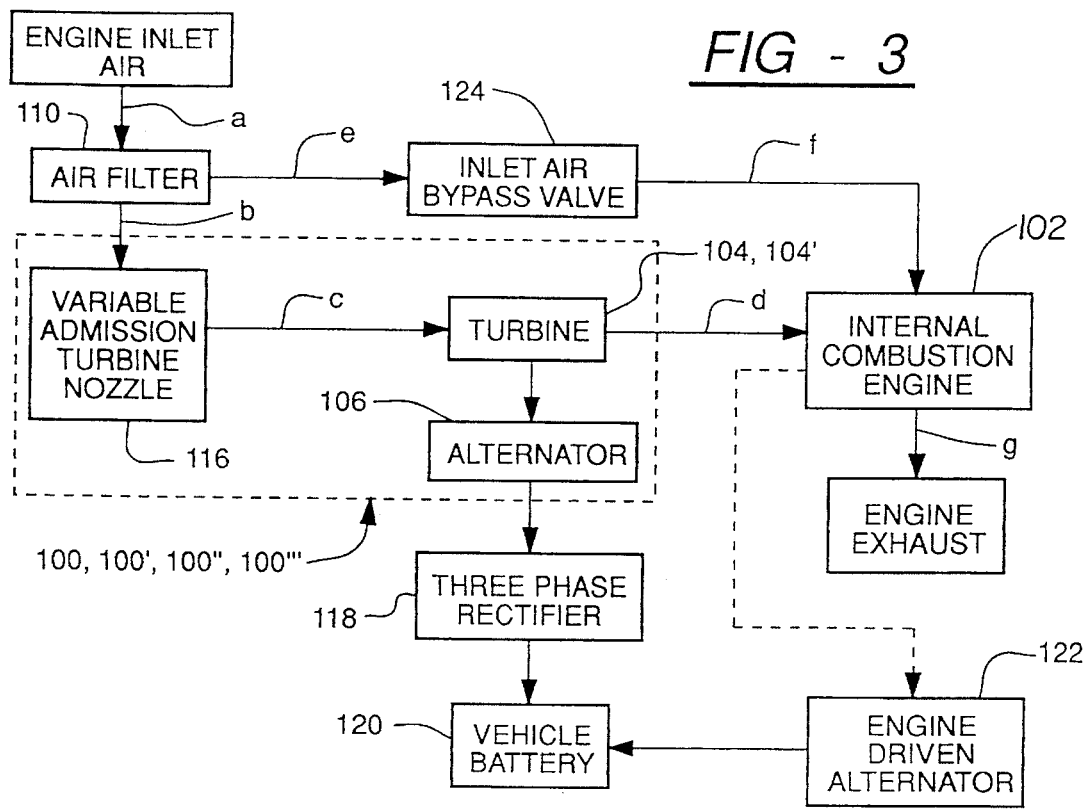
FIG. 3 is a block diagram schematically illustrating the combination of an induction air driven alternator assembly with a port fuel injected engine in a vehicle battery charging system.

The block diagram of FIG. 3 illustrates schematically the combination of either of the induction air driven alternator assemblies 100, 100" into a typical port fuel injected engine vehicle battery charging system.

Figure 4A:
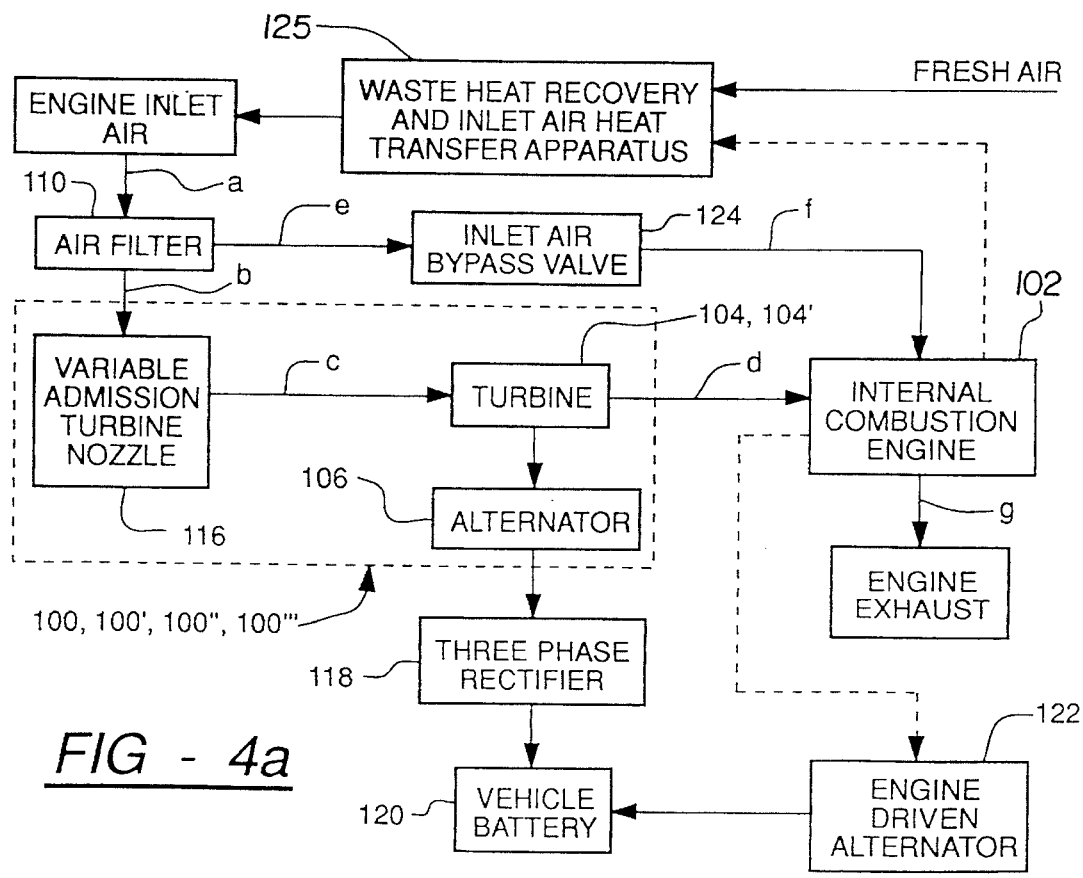
FIG. 4a is a block diagram schematically illustrating the combination of an induction air driven alternator assembly with a port fuel injected engine, having exhaust gas recirculation in a vehicle battery charging system.
Figure 4:
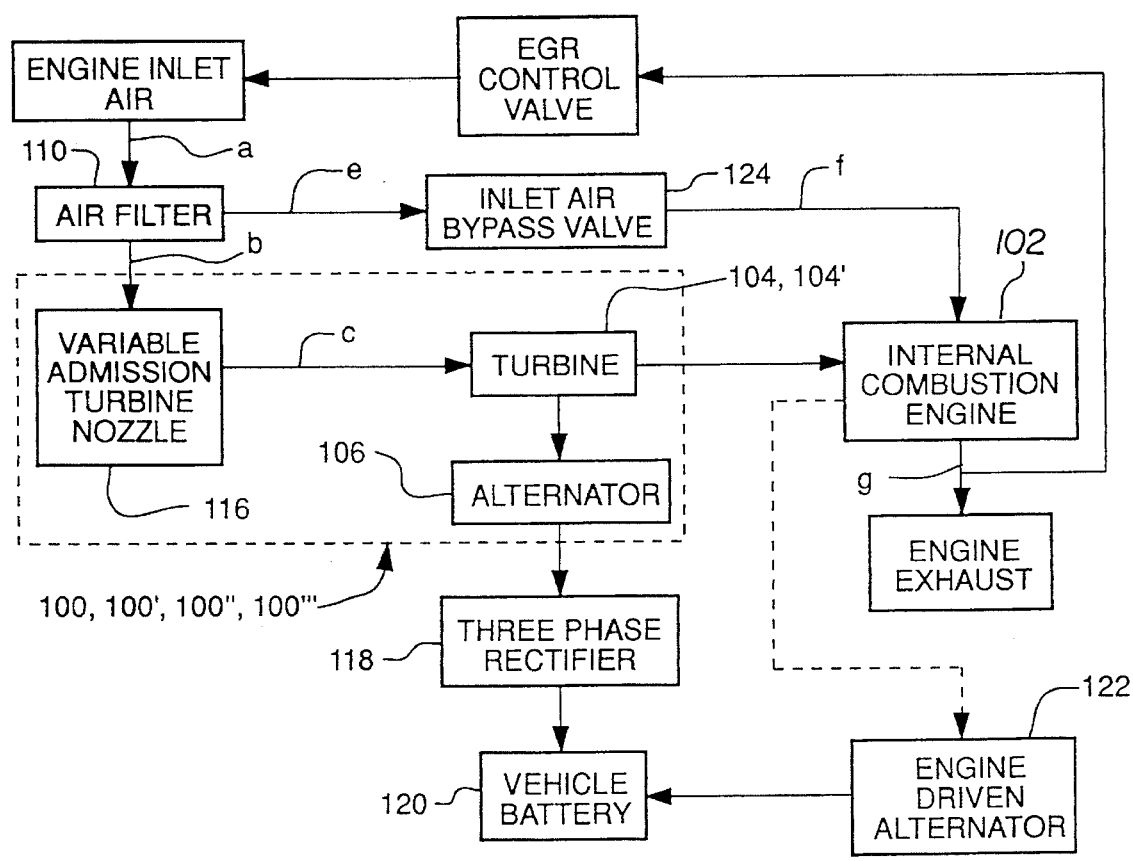
FIG. 4 is a block diagram schematically illustrating the combination of an induction air driven alternator assembly with a port fuel injected engine, utilizing heat exchange devices to recover waste heat from various components such as a muffler, catalytic converter or exhaust manifold, in a vehicle battery charging system.

With continued reference to FIGS. 3 & 4, ambient inlet air represented by flow a passes through air filter assembly 110 and exits as flow b. Flow b then enters the induction air alternator assembly 100, 100" and passes through a combination valve and turning/acceleration nozzle, or variable admission turbine nozzle 116, before entering the turbine assembly 104, 104' as flow c. Flow c comprises air flowing at a high, directed velocity. Flow c enters the turbine assembly 104, 104' and is turned to a roughly axial direction. The turbine exit flow d leaves the turbine assembly 104, 104' and the induction air alternator assembly 100, 100" proper and enters the intake manifold 108 of the internal combustion engine 102. The momentum of the high velocity air c is converted by the turbine assembly 104, 104' into rotational motion which is communicated to the electrical current generator or alternator 106 by a shaft.

Alternating electrical current exiting the alternator assembly 100, 100' enters a three phase rectifier 118 where the alternating current is converted to direct current. The direct current exiting the three phase rectifier 118 is directed to the vehicle battery 120 for the purpose of charging the battery and also for powering other ancillary systems within a vehicle. Exhaust gas flow from the internal combustion engine 102 leaves as flow g. A conventional belt driven alternator 122 also serves to maintain a charge on the battery 120 and to power various ancillary vehicle systems.

An alternative path around the variable admission turbine nozzle 116 and turbine assembly 104 is provided for periods of engine operation wherein minimum inlet air restriction is desired such as at full engine output power. This alternative path, is regulated by a bypass valve 124. Filtered engine inlet air e is directed into valve 124 and exits as flow f where it enters the engine 102 downstream of the turbine assembly 104, 104'. The bypass valve 124 may be independent or integral with bypass valve 112 of FIG. 2 as hereinafter described. Three phase rectifier 118 may also be either independent or integral with the induction air alternator assembly 100, 100', 100", 100'" as hereinafter more fully described.

In FIG. 4, recirculated exhaust gas is added directly to the engine inlet air in whole or in part. In the block diagram of FIG. 4a, a heat exchange device 125 has been added to the charging system to recover engine heat from a variety of sources including oil, coolant and exhaust and to introduce this heat flux to the engine inlet air in whole or in part. This hot air serves to increase the power output of the induction air alternator assembly 100, 100', 100", 100'".

Figure 7:
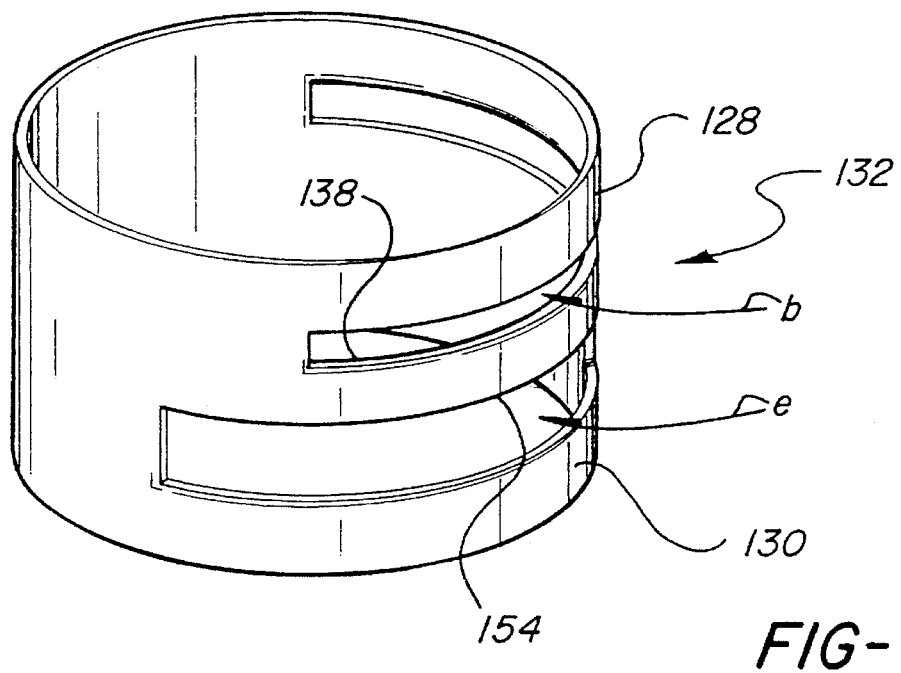
FIG. 7 is a perspective view of a combined inlet and bypass air regulator defined by a control valve of one piece construction for use with the radial inflow induction air driven alternator assembly.
Figure 8:
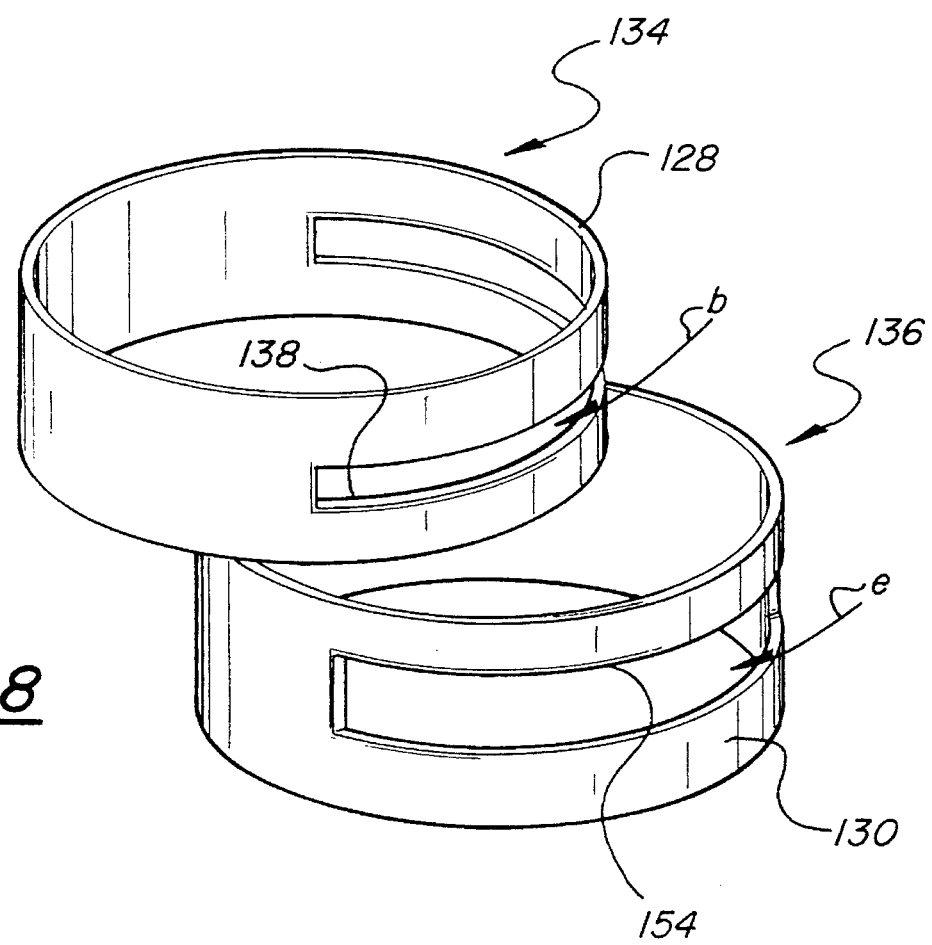
FIG. 8 is a perspective view of independent inlet air and bypass air regulators defined by separate control valves for use with the radial inflow induction air driven alternator assembly.

With further reference to FIG. 1 and with reference to FIG. 5 through 20, the induction air driven alternator assembly 100 illustrated includes a turbine assembly 104 of a radial construction and is shown in greater detail mounted in housing 126. The turbine assembly 104 of alternator assembly 100 includes a controllable turbine inlet or control valve 128 defined by a rotatable valve. Turbine assembly 104 also includes a bypass or control valve 130 defined by a rotatable valve. In the embodiment of alternator 100 illustrated, the inlet and bypass air control valves are combined on one combined turbine inlet and bypass control valve 132 of one piece construction and shown in FIG. 7. Alternatively, the turbine inlet air control 128 and bypass air control valve 130 are defined by individual valves as illustrated in FIG. 8. Inlet air flows are illustrated by arrows b and c.

With reference to FIGS. 5 and 6, the alternator assembly 100 includes a radial turbine driving an axial gap type alternator. Turbine inlet air b is communicated through the aperture 138 in the turbine inlet control valve 128 through the turbine nozzle 140 and impinges the turbine blades 142 which are supported by turbine disc 144. Induction air d exits the turbine blade row and exits the induction air alternator assembly 100. The turbine disc 144 also provides the structural support for alternator magnets 146. The number of alternator magnets 146 are selected in accordance with the desired frequency range of the output alternating frequency of the unit. Stator 148 contains the requisite backiron, insulation and wire coils necessary for the generation of electrical current. The turbine disc 144 is supported and located by a stationary shaft 150 mounted in housing 126 and a bearing package 152.

Turbine bypass air e flows through the aperture 154 in the turbine bypass air control valve 132 and enters the turbine bypass channel 164 as flow f before merging with the turbine discharge air d and exiting the assembly 100.

Bypass air control valve 132 is supported by torque-tube type bearings 156 and is concentrically mounted around housing 126. Valve 132 is therefore rotatable relative to the housing 126. In the case of the two-piece construction, control valves 128 and 130 are independently rotatable relative to each other. Bypass air control input for valve 132 is provided by lever 158 which can be connected to a mechanical or electro-mechanical controller, hereinafter described. The clearances between the bypass air control valve 132 and the housing 126 are sealed by O-rings 160. Bleed holes 162 are provided in the bypass air control valve 132 inboard of the valve support bearings 156 to eliminate any pressure differential across the valve support bearings which would cause grease to migrate from the bearings.

The operation of alternator 100 is illustrated in FIG. 9 through 20 through four selected operational positions of the bypass air control valve 132.

With reference to FIGS. 9–11, alternator assembly 100 includes a radial turbine driving a radial gap type alternator. Therein, the assembly is shown in an engine idle condition wherein the bypass port 164 is blocked and only turbine nozzle 140 is open for flow. Turbine nozzle 140 which communicates combustion air into the intake manifold 108 has been sized to meet the idle airflow requirements of engine 102. Flow through the alternator 100 is illustrated by arrows wherein inlet air is referenced b, nozzle passageway air c and discharge air d.

FIGS. 12–14 illustrate alternator 100 in a partially open throttle condition wherein the combined inlet and bypass air control valve 132 has been rotated in a clockwise direction 90° from the idle position shown in FIG. 9. In this position, the turbine inlet aperture 138 is at a part-throttle position, the bypass port 164 is occluded and about 50% of the total turbine nozzle 140 is open for flow.

In FIGS. 15–17, bypass air control valve 132 has been rotated clockwise 180° from the idle position as shown in FIG. 9. In this position, the turbine inlet aperture 138 is at full nozzle aperture and the bypass port 164 is just beginning to be exposed. Additional inlet air then begins to enter alternator 100 through the bypass aperture 154 into bypass port 164 and is illustrated as flows e and f.

FIGS. 18–20 illustrate a full throttle condition wherein the bypass air control valve 132 has been rotated clockwise 270° from the idle position shown in FIG. 9. In this position, the turbine inlet aperture 138 is about 50% open and the bypass port 164 in FIG. 9 is fully open.

FIG. 21 illustrates alternator 100 wherein an electrically operated stepper motor actuator assembly 170 is connected to the inlet and bypass air control valve 132. Stepper motor actuator 170 is a bidirectional actuator and is operable to rotate bypass air control valve 132 in both clockwise and counterclockwise directions to control the combustion air intake to the engine intake manifold 108.

In an alternative construction illustrated in FIGS. 22–23, the induction air driven alternator assembly 100' includes an axial turbine assembly 104' for converting the inlet combustion air into rotational motion which drives the alternator 106. Like alternator assembly 100, alternator 100' is mounted on the intake manifold 108 of the port fuel injected engine 102.

With continuing reference to FIGS. 22 and 23, the induction air driven alternator assembly 100' illustrated therein does not include integral turbine bypass structure. Therefore, as illustrated in FIG. 2, separate bypass 112 in parallel flow communication relationship with alternator assembly 100' is also mounted on the engine intake manifold 108. Inlet air b enters the inlet side 174 of the assembly and flows through turbine inlet aperture 176 in the turbine inlet air control plate 178 before entering turbine nozzle flowpath 180. Turbine inlet and control plate 178, illustrated in FIG. 23, is moveable relative to nozzle assembly 218. Movement of the turbine inlet air control plate 178 adjusts the open or exposed area of nozzle assembly and flow of inlet air into intake manifold 108. The turbine inlet air control plate 178 is supported, and rotates on a stationary support shaft 182 which is attached to the nozzle assembly 218 in concert with aperture support bearings 184. Aperture support bearings 184 also maintain the proper clearance and axial relationship between the moveable turbine inlet air control plate 178 and the stationary nozzle assembly 218. O-ring 186 limits unwanted air leakage around the 218 turbine inlet aperture 176 into the turbine nozzle passageway 180. The moveable turbine inlet air control plate 178 is rotated to a selected position for engine 102 operation through mechanical or electro-mechanical input by bell crank 188.

Air flow leaving the nozzle passageway 180 flows through the turbine assembly 104' as shown in FIG. 38 and exits as flow d. Flow d is then communicated through concentric passageway 190, exits alternator assembly 100' and enters into the engine intake manifold 108. Support struts 192 are placed at periodic intervals across concentric pathway 190 in order to support the inner housing 194 relative to the outer support housing 196 and to maintain turbine blade 198 clearance relative to the outer support housing 196.

Contained within the inner housing 194 are bearing supports 200 and alternator stator 202. An alternator shaft 204 is supported and permitted to freely rotate along with the turbine blades 198 by bearings 206. The permanent magnets required for the generation of electrical current are contained with the shaft 204 through conventional means. Electrical current exits the assembly 100" through a wiring harness 208 through appropriate holes drilled within the inner and outer support housings 194,196.

Passageways 210 ensure that no adverse pressure gradients take place across the bearings 206 which would force grease out of the bearings.

FIGS. 24-35 illustrate another induction air driven alternator 100" of the axial turbine type wherein the alternator assembly includes an integral bypass air aperture 212 incorporated into the aperture plate 178'. The operation of alternator 100" is illustrated through four selected operational positions of the combined inlet and bypass air regulator or aperture plate 178'.

FIGS. 24-26 illustrate alternator 100" in an engine idle condition wherein bypass port 214 is occluded and only a small sector of turbine nozzle passageway 180 is exposed for flow. Incoming air b enters the inlet side 174 of the assembly 100" and flows through the turbine inlet aperture 176 in aperture turbine inlet air control plate 178' and into the turbine nozzle assembly 218. Included in the turbine inlet air control plate 178' is bypass air aperture 212. The exposed inlet air flow area of the bypass air aperture 212 is dictated and controlled by the relative location of the moveable turbine inlet air control plate 178' and the stationary bypass port 214.

FIGS. 27-29 illustrate alternator 100" in a partially open throttle condition wherein the turbine inlet air control plate 178' has been rotated 90° clockwise relative to the stationary nozzle assembly 218 to expose a larger sector of turbine nozzle flowpath 180 area. This position is 90° from the idle position of FIG. 24. In this position, the nozzle aperture is open about 50% and the bypass port 214 is restricted.

FIGS. 30-32 also illustrate alternator 100" in a part throttle condition. Herein, the turbine inlet air control plate 178' has been rotated 180° from the idle position of FIG. 24 and all the nozzle assembly admission area is exposed. In this position, the moveable nozzle bypass air aperture 212 is just beginning to expose underlying stationary nozzle bypass port 214 in nozzle assembly 218. Nozzle bypass air f flowing through bypass port 214 merges with the turbine assembly discharge air d in passageway 190 and discharges from the assembly into the engine intake manifold 108.

In FIGS. 33-35, turbine inlet air control plate 178' has been rotated 270° clockwise from the idle position illustrated in FIG. 24. In this full throttle position, the turbine inlet aperture 176 exposes about 50% of the nozzle aperture and the bypass air aperture 212 fully exposes nozzle assembly 216 bypass port 214. Nozzle bypass air f flowing through bypass port 214 merges with the turbine assembly discharge air d in passageway 190 and discharges from the assembly into the engine intake manifold 108. Bypass port 214 is sized such that its total cross sectional area is larger than the full turbine nozzle admission area. FIG. 33 illustrates flowpath f through outer housing 196 and the area where flow f merges with turbine discharge flow d in passageway 190.

FIG. 36 illustrates alternator 100'" wherein an electrically operated stepper motor actuator 220 is connected to the combined inlet and bypass air regulator or turbine inlet air control plate 178'. Stepper motor actuator 220 is a bi-directional actuator and is operable to rotate turbine inlet air control plate 178' in both clockwise and counterclockwise directions to control the combustion air intake to the engine intake manifold 108.

FIG. 39 illustrates a preferred embodiment of an axial turbine and radial gap type alternator assembly 100'" for interpositioning in the engine air intake. Engine inlet air b enters the assembly through inlet 228. A turbine nozzle 230 turns the air to the proper angle for admittance to the turbine assembly, defined in part by a disc 232 and blade passages 234, and accelerates the flow. Acting in conjunction with an aperture or metering plate 236, throttle cable inputs to lever 238 connected to the aperture plate cause the aperture plate to move in a rotational manner within housing 240. Depending on the angular location of the aperture plate 236, some or all of the turbine inlet nozzles 230 will be eclipsed, causing control of the engine airflow as well as ensuring that maximum kinetic energy is delivered to the turbine assembly disc and blade passages 232, 234.

Leaving the turbine nozzle 230 at the optimum angle, the air then enters turbine blade passages 234 where the momentum of the air turning in the turbine blade passages delivers torque to disc 232 which is connected to a shaft 242 and then to a permanent magnet rotor 244. The shaft is supported by bearings 246. Electrical power or current is generated in the alternator stator 248 as shaft 242 is rotated. The current is converted to DC voltage in the rectifier 250, and passed out of the housing 240. Air exiting the turbine is further diffused by virtue of the passage 252 geometry and then exits the assembly 100".

The bearings 246 may be grease lubricated ball bearings, or it may be desired to integrate the unit with the host engine oil system. This oil may be squirted into the bearings where the bearings may take the form of either ball or journal bearings. The stator 248 may require additional cooling. This may be accomplished by heat transfer through the housing 240 and then to support fins 254 for dissipation to the alternator discharge air, or the engine oil may be directed around the stator 248 through passages 256 to effect the necessary heat transfer. Oil lubricated bearings of the ball or journal type permit faster design rotational speeds with little sacrifice in bearing life. Faster rotational speeds permit significant reductions in turbine diameter to occur.

If poor engine operation results at either the idle or full power extreme as a result of the inherent metering characteristics of the aperture plate 236, small bleed holes 258 or smaller nozzle aerodynamic passages may be incorporated into the nozzle 230 to achieve a more satisfactory idle engine operation. This construction is shown in FIG. 40. Alternatively, a conventional idle air control valve similar to the General Motors IAC solenoid may be added to bleed idle air around the nozzle 230. Enhanced full power operation may be achieved by integrating a larger external bypass air valve as hereinabove described and shown in FIG. 2, to be opened by the vehicle throttle cable when the aperture plate 236 is fully exposing all turbine nozzles 230 and more engine 102 output power is desired. As herein described, this bypass may take the form of an altogether separate valve assembly, or an integral bypass timed to open as the nozzle reaches full aperture or integral but controlled separately.

Each of the induction air driven alternator assemblies 100, 100', 100", 100''' herein illustrated is a three phase, permanent magnet alternator. These alternators characteristically produce an electrical output which is linearly proportional to rotating speed operating into a constant load. The voltage is also affected as a function of electrical load while the induction air driven alternator 100, 100', 100", 100''' is operated at a constant speed. When the turbine driven alternator is connected to the vehicle battery, the vehicle electrical loads in conjunction with the battery itself serve to load and govern the speed of the turbine. As a result, induction air alternators 100, 100', 100", 100''' are always operating at a speed which will charge the vehicle battery and unload the conventional engine driven alternator.

Each induction air driven alternator 100, 100', 100", 100''' always operates at a speed dictated by the bus voltage of the vehicle and the energy available at the turbine. If no energy is available at the turbine, such as at full engine output with minimal pressure drop at the turbine nozzle, the speed of the alternator may drop along with the output voltage. In this circumstance, the battery is blocked from discharging into alternator windings by the rectifier assembly.

Through the application of induction air driven alternators 100, 100', 100", 100''', additional vehicle fuel economy is realized because the alternator is reducing the power output requirements of a conventional engine driven alternator whose efficiency is typically only about 50%. Therefore, the net improvement to fuel economy is not only the power recovered by the alternator but also the additional 50% inefficiency which would have been lost if the engine driven alternator was generating the required power. If it is determined that in a particular vehicle system installation there exists a potential of battery or electrical system damage due to overcharging or high voltage, the three phase rectifier may be replaced with one containing an SCR bridge rectifier assembly thereby allowing alternator output voltage regulation to take place through the use of pulse width modulation techniques. Other alternatives for regulating output power include the use of pulse width modulation techniques to regulate DC terminal voltage through the use of a conventional voltage regulation circuit.

Still another technique would be to turn on ancillary loads in the vehicle to provide satisfactory alternator loads. Some loads, such as a radiator/air conditioning condenser cooling fan could enhance the efficiency of other vehicular systems when utilized.

Still another technique involves bypassing air around the turbine nozzle directly into the engine, to control output power.

On the premise that operating speeds at or below 25,000 RPM are desired to enjoy satisfactory life from the bearings of the alternator, a study was conducted using conventional engine operating data to determine an optimum turbine design. An axial turbine of the partial admission variety was found to be the most satisfactory design to be utilized in the disclosed apparatus. Such a design permits the use of an integral throttling plate to simultaneously govern engine flow and power with the standard automotive throttle hookup while controlling the number of nozzle apertures open to admit flow to the turbine.

In addition, the installation of such a device on the air inlet of an internal combustion engine causes the air temperature to drop across the turbine and nozzle as a result of the near isentropic expansion which takes place. As a result, on a given day, an engine equipped with the induction air driven alternator can develop more power than an engine equipped with a conventional butterfly valve throttle due to the lower engine air inlet temperatures (i.e. higher density air).

With further reference to FIG. 4, the hereinabove described turbine and alternator assemblies 100, 100', 100", 100''' can make good use of recirculated engine exhaust gas and waste heat when the recirculated portion of the exhaust gas is introduced into inlet air intake or throttling system. By introducing recirculated exhaust gas together with the combustion air, additional energy in the form of heat is available to be converted into electrical current. In addition, through the introduction of recirculated exhaust gas through the inlet air intake, engine charge air inlet temperature exiting the alternator assembly is less than systems where recirculated exhaust gas is introduced downstream of the inlet of the throttling system. A similar effect takes place when air heated by other surplus means is introduced to the inlet air intake.

The energy equation relating the isentropic enthalpy change available for the expansion process in the turbine assembly is:

$$\Delta H = Cp \cdot °R \cdot \left(1 - \frac{1}{ER}\right)^{\frac{k-1}{k}}$$

where:

ΔH=Change in Enthalpy, Btu/lb

Cp=Specific Change Heat, Btu/lb R

R=Inlet Air Temperature, R

ER=Expansion Ratio k=Ratio of Specific Heats

As can be seen, a first order relationship exists between inlet absolute temperature and available specific work. Introduction of recirculated exhaust gas or otherwise heated air with the ambient inlet air raises the inlet temperature to the turbine resulting in a nearly proportional increase in available energy for the turbine. The available energy is only nearly proportional as the specific heat of exhaust gas is slightly lower than that of pure air.

FIGS. 41 and following illustrate three exemplary embodiments of the invention developed particularly for use in replacement of throttle bodies for the intake manifolds of internal combustion engines having inlet port fuel injection separate from the throttle body. These embodiments all incorporate a turbogenerator or turboalternator (TA) comprising an intake air driven turbine directly driving an alternator, an air flow control (throttle) for the turbine and a bypass passage around the turbine all enclosed within a body. Obviously other arrangements of the significant features of these embodiments could also be made within the scope of the invention.

Referring first to FIGS. 41–53, numeral 300 generally indicates a coaxial flow axial gap form of turboalternator air flow control assembly. Assembly 300 has a body 302 made up, for convenience, of several elements including a main housing 304, end cap 306, cover 308 and base 310. Within the body are mounted a rotor 312, stator 314, nozzle member 316, flow control valve 318 and a valve actuating mechanism 320. Mechanism 320 includes a drive sleeve 322, spring 324, gear sector 326 and accelerator linkage 328.

The cover 308 mounts upon an inlet end of the main housing 304 and defines an inlet 330 connectable with an external inlet hose, not shown and defining an air flow inlet port. A boss 332, adjacent the inlet 330 carries the gear sector 326 and the connecting accelerator linkage 328. A pocket 334 adjacent the inlet receives one end of a shaft 336 that forms a part of the nozzle 316 member and extends on a central axis 338 through an inlet plenum 340 within the main housing 304.

Adjacent to the plenum 340, the housing 304 defines coaxial outer 342 and inner 344 cylinders centered on the axis 338 and connected by annularly spaced support ribs 346 to define a ring of annularly spaced flow passages comprising a cylindrical bypass 348. A wire port 350 through the cylinders interrupts the bypass 348 at one point. A grommet 351 is preferably provided to protect the wires and prevent leakage. Adjacent to the plenum 340, the upstream ends of the cylinders 342, 344 define a planar valve seat 352.

The nozzle 316 member includes a cupped portion 354 connected and coaxial with the shaft 336 and received within the inner cylinder 344 of the housing 304. A group of five annularly spaced standard converging turbine nozzles 356 are formed in the periphery of the cupped portion 354 with their outer sides closed by shrink fitted engagement with the inner cylinder 344. The stator 314, comprising a stationary iron core 360 containing a plurality of annularly spaced electrically conductive coils 362, is received within the cupped portion 354 and is held against a seat 364 to fix its position. Wires 366 connecting with the coils extend out through the grommet 351.

The end cap 306 is secured to an outlet end of the housing 304 together with the base 310. Bearings 368, received in a pocket of the end cap 306, rotatably mount on the axis 338 a rotor shaft 370 of the rotor 312. A turbine wheel 372 is mounted on the shaft 370 having peripheral blades 374 radially aligned with the nozzles 356. The wheel 372 also carries a magnetic flux ring 376 and a plurality of permanent magnets 378 having axial surfaces spaced with a small gap from the stator coils 362. The end cap 306 also defines an outer ring 380 of passages aligned with the bypass 348 and an inner ring 382 of diffuser passages radially aligned with the turbine blades 374. Both passage rings connect with a discharge passage 384 which begins as an annulus adjacent to the end cap and terminates in a cylindrical portion, preferably including flow straighteners 386 in the end adjacent to a flange 388 or other suitable mounting means.

The flow control valve 318 comprises a ribbed circular plate having a control portion that seats against the valve seat 352 of the housing and an annular seat 389 formed on the shaft end of the nozzle member cupped portion 354. An arcuate slot 390 through the valve extends for less than a half circle and is radially aligned with the nozzles 356. The slot 390 preferably has a tapered or sharp leading end 391. An annular extension 392 of the valve 318 extends, when closed, into an annular portion of the bypass 348. The inner portion of the extension 392 is contoured to provide a varying annular flow area as it is raised out of the bypass 348. Inwardly, the valve 318 has openings 393 for admitting bypass air flow.

The valve 318 has a grooved hub 394 which engages helical flutes 395 on a shaft portion 396 of the drive sleeve 322 on which the valve is mounted. The sleeve 322 is rotatable on the shaft 336 and includes a pinion gear 397 that is drivingly engaged by the gear sector 326. The sector 326 is connected with a lever 398 of the accelerator linkage 328. Spring 324 seats on a flange of the drive sleeve 322 adjacent the pinion gear 397 and biases the valve 318 in a bypass closing direction against the seats 352 and 389.

In operation, when mounted on an engine intake manifold, air is admitted through the inlet 330 into the plenum 340 from which it passes in amounts allowed by the valve 318, through the turbine nozzles 356 and blades 374 or through the turbine bypass 348. At idle, the bypass is closed and the valve 318 is positioned nearly closed so that only the sharp end 391 of the air control slot 390 is aligned with one of the nozzles to allow limited idle air flow therethrough against the turbine blades.

As higher levels of engine power are required for normal city driving or highway cruising, the lever 398 is actuated to pivot the gear sector 326 and rotate the drive sleeve within the range of up to a half turn. This rotates the valve 318, held by the bias of spring 324 against the seats 352, 359, opening the slot 390 to allow increased air flow through a sequentially increasing number of the nozzles 356 until maximum flow through all the nozzles is reached. At this point, the valve 318 engages a stop 399 in the housing 304 that prevents further rotation of the valve. Sequential opening of the nozzles allows the air flow to be delivered to the turbine blades with minimum throttling losses so that the energy in the accelerated gases can be absorbed by the turbine and converted by the connected alternator into electrical energy. This process provides the necessary control of air flow to the engine to control its output power as selected by the operator through operation of the accelerator linkage.

When additional power is required for acceleration, heavy loads or high speed operation, the valve 318 being against the stop 399, further rotation of the lever 398 causes the flutes 395 on the drive sleeve 322 to cam the valve 318 axially against the bias of spring 324. This unseats the valve and allows air flow through openings 393, outwardly past the seats 389 and 352 and into the cylindrical bypass 348, which is outward of and coaxial with the turbine wheel 372 and the associated nozzles 356. The amount of bypass flow is regulated by the contour of the annular extension 392 as it is raised out of the bypass 348 by lifting of the valve 318. As the bypass is opened further toward full load operation of the associated engine, the pressure differential available across the turbine nozzles is reduced and generation of electrical energy by the turboalternator is limited or may be terminated until a lower throttle setting is selected.

Referring now to FIGS. 54–64, numeral 400 generally indicates an alternative coaxial flow radial gap form of turboalternator air flow control assembly. Assembly 400 has a body 402 made up, for convenience, of several elements including a main housing 404, end cap 406, cover 408 and base 410. Within the body are mounted a rotor 412, stator 414, nozzle member 416, flow control valve 418 and a valve actuating mechanism 420. Mechanism 420 includes a drive sleeve 422, spring 424, gear sector 426 and accelerator linkage 428. The structure and operation of assembly 400 are quite similar to those of assembly 300; however, significant differences in the radial gap form of the alternator result in structural differences. The following description references similarities and differences from the assembly 300 embodiment.

Cover 408 is generally similar having an inlet 430, boss 432, and a pocket 434 receiving shaft 436 with a central axis 438 extending through an inlet plenum 440 all related as in the prior embodiment. The housing 404 has outer 442 and inner 444 cylinders centered on the axis 438 but there are no passages between them. Instead, the nozzle member 416 is provided with an additional outer wall 445 from which support ribs 446 extend inward to partially define a ring of annularly spaced passages that comprise a cylindrical bypass 448 centered on the axis 438. Laterally aligned openings through walls 442, 444, 445 define a wire port 450 and the upstream end of the inner cylinder 444 defines a valve seat 452.

As before, the nozzle member 416 includes a cupped portion 454 connected and coaxial with the shaft 436 and which, in this embodiment, is connected with the support ribs 446 to define the coaxial bypass 448. In the periphery of the outer wall 445 of the nozzle member 416, are formed five turbine nozzles 456 defined and placed similarly to those of the prior embodiment and including similar guide vanes, not shown. The stator 414 comprises a stationary iron core 460 with a plurality of annularly spaced electrically conductive coils 462 which, in this case, are placed in generally cylindrical fashion around the rotor 414. The stator core 460 is shrink fitted within the cupped portion 454 to fix its position. Wires 466 connecting with the coils extend out through the port 450.

As before, the end cap 406 is secured to the outlet end of the housing 404 together with the base 410. Bearings 468 are received, one in a pocket of the end cap 406 and the other in a similar pocket in the cupped portion 454 of the nozzle member 416. The bearings 468 mount a rotor shaft 470 of the rotor 412 for rotation on axis 438. A turbine wheel 472 is mounted on one end of the shaft 470 having peripheral blades 474 radially aligned with the nozzles 456. Inwardly the wheel 472 has several openings 475 communicating with the bypass 448. The shaft 470 also carries a magnetic core 476 mounting a plurality of permanent magnets 478 having radial surfaces spaced with a small gap from the stator coils 462. The end cap 406 also defines a half ring 480 of openings communicating with the turbine wheel bypass openings 475. A complementary half ring of diffuser passages 482 are provided in the end cap aligned with the turbine nozzles 456. Both half rings connect with a discharge passage 484 similar to that of the prior embodiment and including flow straighteners 486 in a flange 488 or its equivalent.

Unlike the prior embodiment, the flow control valve 418 is generally cup shaped, having a flange-like control portion that seats against the valve seat 452 of the housing and an annular valve seat 489 formed on the nozzle outer wall 445. An arcuate slot 490 having a sharp leading end 491 is positioned in the valve as in the prior embodiment. An annular extension 492 of the valve inward of the slot 490 extends, when closed, into an annular inlet portion of the bypass 448. The outer portion of the extension is contoured to provide varying bypass flow area.

The valve 418 also has a grooved hub 494 engaging helical flutes on a shaft portion 496 of sleeve 422 which includes a pinion gear 497 driven by gear sector 426 connected with lever 498 of the accelerator linkage 428, all as in the prior embodiment. As before, spring 424 biases the valve 418 in a bypass closing direction and a stop 499 on the housing 404 limits rotation of the valve.

Operation of the turboalternator control assembly 400 is like that of assembly 300, the only functional difference being that the concentric bypass flow passes inside the nozzles rather than outside as before.

Referring now to FIGS. 65–70, numeral 500 generally indicates still another alternative embodiment comprising a parallel flow radial gap form of turboalternator air flow control assembly. Assembly 500 has a body 502 made up, as before, of several elements including a main housing 504, end cap 506, cover 508 and base 510. Within the body are mounted a rotor 512, stator 514, nozzle member 516, flow control valve 518 and a valve actuating mechanism 520. Mechanism 520 includes a pinion gear 522, gear sector 526 and accelerator linkage 528. The structure and operation of assembly 500 are quite similar to those of assembly 400; however, differences in the axial bypass in the body result in structural differences. The following description references similarities and differences from the assembly 400 embodiment.

Cover 508 is somewhat similar having an inlet 530, boss 532, and a pocket 534 receiving shaft 536 with a central axis 538 extending through an inlet plenum 540. The housing 504 has outer 542 and inner 544 cylinders centered on the axis 538 but, again, there are no passages between them. However, the nozzle member 516 is provided with an additional outer wall 545 from which support ribs 546 extend inward. Unlike the prior embodiments, there are no coaxial bypass passages. Instead, the outer cylinder 542 is connected at one end along one side to a bypass cylinder 548 centered on an axis 549 spaced from and parallel with the central axis 538. Laterally aligned openings through walls 442, 444 define a wire port, not shown, and the upstream end of the inner cylinder 544 defines a valve seat 552.

As before, the nozzle member 516 includes a cupped portion 554 connected and coaxial with the shaft 536 and which, in this embodiment, is connected with the support ribs 546. In the periphery of the outer wall 545 of the nozzle member 516, are formed five turbine nozzles 556 defined and placed similarly to those of the prior embodiment and including similar guide vanes, not shown. The stator 514 is identical to that of embodiment 400, including a stationary iron core 560 having coils 562 and shrink fitted within the cupped portion 554 to fix its position. Wires, not shown, connecting with the coils 562 extend out through the wire ports, not shown as in prior embodiments.

As before, the end cap 506 is secured to the outlet end of the housing 504 together with the base 510. Bearings 568 are received, one in a pocket of the end cap 506 and the other in a similar pocket in the cupped portion 554 of the nozzle member 516. The bearings 568 mount a rotor shaft 570 of the rotor 512. Constructed and located similarly to the rotor 412 of embodiment 400, the rotor 512 includes a turbine wheel 572 with blades 574 and a shaft mounted magnetic core 576 mounting permanent magnets 578 spaced with a small gap from the stator coils 562. However, there are no concentric bypass openings in the rotor or the end cap 506 in view of the parallel bypass 548. A half ring of diffuser passages 582 are provided in the simplified end cap aligned with the turbine nozzles 556. The passages connect with a discharge passage 584 in the base 510 having an outlet with flow straighteners 586 located in a flange 588 or its equivalent. The outlet and flange 588 are centered on the parallel axis 549 in alignment with the bypass passage 548.

As in the prior embodiment 400, the flow control valve 518 is generally cup shaped, having a flange-like control portion that seats against the valve seat 552 of the housing and an annular valve seat 589 formed on the nozzle outer wall 545. An arcuate slot 590 having a sharp leading end 591 is positioned in the valve as in the prior embodiments. Unlike the prior embodiments, flow through the bypass 548 is controlled by a butterfly valve 492 in the housing. The inlet 530 in cover 508 and the outlet in flange 588 are preferably aligned with the bypass 548 on axis 549 to minimize flow losses during full power operation of the engine. The flow control valve 518 is rotated for flow control by the integral pinion gear 522 which is driven by gear sector 526 connected with a lever 598 of the accelerator linkage 528.

Operation of the turboalternator control assembly 500 is much like that of assemblies 300 and 400. It is simplified however by the elimination of axial movement of the flow control valve 518 since it does not control bypass flow. Instead the butterfly valve 592 is suitably controlled by external linkage or other means to control bypass flow and provide the same results as in operation of the prior embodiments.

While differing aspects of three embodiments have been illustrated and described in detail, it should be understood that variations of these features may be made if desired. For example, an axial gap alternator as in the first embodiment could be combined with a parallel path bypass as in the third embodiment. In addition, several described or optional features of the arrangements described are common or at least similar in design. Some of these common features will now be described.

One common feature is the nozzle flow path illustrated in FIG. 48 which may be common to all the embodiments. In this version, all five nozzles 356 are converging nozzles of the same size, selected to obtain high conversion efficiency when operating fully open. The nozzles are sequentially opened by rotation of the control valve so that no more than one of the nozzles will have restricted flow at a time. In this way, most efficient energy conversion is obtained.

FIGS. 71–73 illustrate three optional variations in the nozzles which may be substituted in any of the turboalternators for that of FIG. 48 if desired. In FIG. 71, nozzle member 600 has five nozzles, of which the last four nozzles 356 are similar to those of FIG. 48. However, a nozzle 602, which is first opened by the control valve or is continually open, is used principally for idle control. It is made smaller to meet most engine idle air flow demands and may assume geometry suitable for supersonic flow. This allows higher flow velocities for operation at or near idle.

FIG. 72 illustrates another variation in which a nozzle member 604 has five nozzles 356 plus a hidden supersonic nozzle 606 which is separately fed and controlled for idle operation. Higher flow velocities at and near idle may be obtained without reducing the high power flow range. In FIG. 73, another alternative nozzle member 608 combines four larger nozzles 356 and one smaller nozzle 602 with a hidden supersonic nozzle 606. This combination may provide higher flow rates for generating electricity at low engine power and idle settings with greater conversion of normal throttling losses into useful electric energy.

Any suitable method may be used for positioning the flow control valve and, where used, the separate bypass valve. The pinion and sector gears illustrated represent one form chosen because it allows an external lever connected with an accelerator cable, not shown, to rotate the internal throttle through 180 degrees with lesser rotation of the lever. Additional rotation of the drive sleeve in the coaxial bypass versions is also provided. However, full or partial electrical control by the engine on-board computer may also be provided.

In FIG. 74 a bypass idle air control valve 610 is shown mounted on the housing 612 of a coaxial bypass assembly similar to 400. Valve 610 includes a valve plug 614 driven by an actuator 616 and closing an idle bypass opening through which turbine inlet air may be bypassed around the turbine. Microprocessor control of the bypass valve plug 614 could supplement a mechanical sub-idle speed setting of the turbine flow control valve (e.g. 418) to maintain idle speed control but with some added throttling loss.

A similar but larger valve 610 could be used to control turbine output power and prevent overcharging a system. The microprocessor would variably open the valve as required by electrical system conditions while partially closing the turbine flow control valve to maintain constant engine conditions. This provides an electronically controlled method of mechanically regulating the power output of the turboalternator.

FIG. 75 illustrates a combination idle bypass and turbine power control bypass valve 616. An actuator 618 drives an idle air valve plug 620 movable within a bypass valve plug 622 to control idle air flow through the bypass plug 622. A spring 624 holds the bypass plug 622 closed until the idle plug 620 is opened against a lighter idle plug spring 626 far enough to engage the bypass plug 622 to force its opening.

An alternative method of idle air control is illustrated in FIG. 76 where an idle air valve 628 is mounted to control idle air flow from the turbine inlet (e.g. 440) to a hidden supersonic nozzle 606. With this arrangement, idle air is all directed into the turbine to obtain maximum power generation at idle.

FIGS. 77A and 77B disclose an electronic method of integrating turbine alternator and engine driven alternator voltage regulation to force the engine driven alternator into a supplemental mode. The battery charging system circuit, including an electronic regulator 630, is designed to work in parallel with the mechanical controls previously described. The regulator 630 is connected to provide signals to a vehicle microprocessor to adjust the mechanical controls and serve as a short term voltage regulator. The regulator controls the system voltage in a vehicle having both a permanent magnet turboalternator (TA) and an engine driven variable field alternator. Output voltage of the TA is determined by turbine speed and load. Output voltage of the engine driven alternator is controlled by varying the current of the alternator field. The two alternators are used together to provide a stable high efficiency output at all vehicle running conditions.

The regulator 630 controls the TA at a set voltage V1 as long as the TA is able to generate sufficient power to maintain the system voltage at that level. If the TA power is inadequate, system voltage will fall to a lower level V2 at which point the engine driven alternator will be controlled to maintain the voltage V2. When the TA is again able to raise the system voltage toward V1, power output from the engine driven alternator will be reduced.

The output voltage from the turbine regulator 630 is initially controlled by sensing and dissipating excessive power generated by the TA. The regulator limits DC output to a set level and provides an analog output proportional to the shunt current. The analog output signal is used to adjust a bypass valve or other means to control the airflow to the turbine, thus maintaining an average set current level through the shunt regulator. This provides a fast acting short term electronic method of voltage regulation for the TA which acts in combination with and supplements the mechanical bypass valve control.

The output voltage of the engine driven alternator is controlled by varying the field current of the conventional automotive alternator. The regulator 630 incorporates overvoltage and over-temperature protection and provides a digital output status signal which indicates the over-temperature shutdown condition.

Referring to FIGS. 77A and 77B, showing the battery charging system circuit diagram, block 631, Power supply circuit, contains transient protection circuitry, filtering, reference voltage generation circuitry and a switched ignition input to reduce quiescent current draw when ignition is off.

Block 632, Control circuit, contains amplifier U1A which senses the voltage difference between Vref and a voltage proportional to the battery voltage though R1, R2 and R3. This error voltage is amplified by U1A and then applied to the gates of Q1–Q4, which controls the Q1–Q4 drain/source resistance thereby controlling battery voltage by dissipating any excess power which would cause the output voltage to rise above the set level V1.

Block 633, Current limit circuit, includes amplifier U1B sensing the voltage across R5 to prevent excessive current flow through the transistors. The currents through Q1–Q4 will be similar, so measuring the current though one device will result in less power dissipation in the sense resistor R5.

Block 634, Current sense circuit, amplifies the voltage across R5 to provide an analog voltage proportional to the current through Q4 which will be proportional to the power dissipated by the regulator. This voltage is used to drive a device (e.g. a bypass valve) which controls airflow to the turbine. This will allow the turbine power output to be controlled to the amount which results in minimum current flow through Q4.

Block 635, Over-temperature shutdown circuit, utilizes amplifier U1D and NTC R14 to sense heat-sink temperature and turn transistors Q1–Q4 off in the event of excessive heat-sink temperature. An open collector digital signal is also output from this block. This can be used to digital an out-of-control regulator condition and/or command the air-flow control device to supply minimum air flow to the turbine.

Block 636, Feedback division circuit, uses R1, R2 and R3 to set the ratio between V1 which is turbine output voltage and V2 which is the engine driven alternator voltage. C1 and C2 are used for noise filtering and frequency response purposes.

Block 637, Engine driven alternator control circuit, includes U2A which senses the voltage difference between Vref and the voltage from Block 636 which is proportional to battery voltage. U2A amplifies this difference and drives Q5 to control alternator field current thereby controlling output voltage level V2. An electronic method is thus provided of integrating the turboalternator and engine driven alternator voltage regulation to force the engine driven alternator into a supplemental mode.

Block 638, Engine driven alternator circuit, consists of a belt driven alternator and rectifier assemblies used to convert the alternator output from AC to DC for both battery and field supply power.

Block 639, Ignition indicator and battery circuit, represents the ignition switch, battery and indicator which indicates charging system failure.

Block 640, Turbine alternator and rectifier assemblies circuit, consists of the TA and the rectifier assemblies which convert the TA output voltage from AC to DC. The use of BR1 in addition to BR2 ensures the shunt regulator will only dissipate power generated by the turbine alternator and not power generated by any other sources.

Some considerations in the design and use of turboalternator systems as described are discussed below.

To keep mass at a minimum, the turbine may be made from a light weight metal, such as aluminum or magnesium or injection molded from a plastic. The following constructions could be employed to prevent chips from being formed and entering the engine in the event of a rub:

A. The housing at the outer diameter of the turbine could be relieved and the relieved portion filled with a nonabrasive, abradable and combustible material. In the event of a minor rub, the coating would abrade away and pass out of the engine as a combustion product.

B. A similar method would be to mold a plastic ring which could be fitted into a relief or annular channel located at the turbine outer diameter. The ring would be sized to provide the proper tip clearance from the turbine over the range of operating conditions. The circular ring is preferably molded of a plastic with a coefficient of expansion comparable with the turbine. A high performance amorphous resin such as a polyehterimide (GE plastics Ultem 4000) may be used for this application. FIG. 56A shows a modification 404' of the main housing of FIG. 56 to include a plastic ring insert 453 at the lower end of the inner cylinder 444' and located to be opposite the ends of the blades 474 of the rotor 412 as illustrated in FIGS. 54 and 62 of the drawings.

In cases where a throttle position sensor is needed, mounting provisions may be located over a linkage pivot. The provisions may include both a means of anchoring a stationary member and moving member of the sensor.

Some units will require provisions to add air mass flow instrumentation. Alternatively, it is possible to use the turbine driven alternator for mass flow sensing, since it can generate mass airflow information as a function of electrical output, turbine/alternator efficiency, pressure drop across the turbine/diffuser, the inlet air temperature, and the barometric pressure.

Using the isentropic enthalpy equation, machine efficiency (measured empirically), barometric pressure, inlet air temperature, and alternator output, the mass airflow can be calculated using the following relationship:

$$M = Es/(H \times Me \times ACF)$$

where:

M=Mass Air Flow

Es=System Output Energy, Btu

H=Enthalpy, Btu/lb

Me=Turbine Alternator Efficiency

ACF=Air Density Correction Factor (ACF=Square Root 0.073/Pa)

Pa=Ambient Air Density

A by-product of the conversion of energy to electrical power is a colder air mass delivered to the engine. Unless the turbine inlet air is preheated, it is possible for ice to form downstream of the turbine. Preheating the air not only helps to prevent icing, but it also causes the electrical power output potential to increase. Heat sources for preheating turbine inlet air include but are not limited to: exhaust manifold, exhaust gas, radiator discharge air, engine coolant or heat rejected by mechanical or electrical devices.

Although the invention has been described by reference to a various specific embodiments, it should be understood that numerous changes may be made within the spirit and scope of the inventive concepts described. Accordingly, it is intended that the invention not be limited to the described embodiments, but that it have the full scope defined by the language of the following claims. The term turboalternator as used in the claims is intended to include turbine driven generators which generate DC electrical power as well as those which provide AC power.

What is claimed is:

1. A turboalternator and air flow control assembly for mounting on a combustion air intake of an internal combustion engine, said assembly comprising:

a body having an inlet and an outlet and defining therebetween an air flow path;

a nozzle carrier in the body and defining a plurality of turbine nozzles spaced arcuately about and generally parallel with a central axis, said nozzles having inlet and outlet ends and forming a portion of said air flow path;

a nozzle valve adjustable to sequentially restrict or close one or more of said nozzles to control air flow against the turbine blades through said nozzles;

a rotor mounted in the body on bearings for rotation on said central axis, said rotor being drivingly connected with an electric generator and including a turbine wheel having blades axially adjacent and radially aligned with said nozzles;

a bypass passage in said body and connecting said inlet and outlet separately from said nozzles; and a bypass valve in said bypass passage and operable to control air flow through said bypass passage.

2. The invention as in claim 1 wherein said electric generator is an alternator having an electrically wound stator and magnets on said rotor axially adjacent to said stator with an axial air gap between them.

3. The invention as in claim 1 wherein said electric generator is an alternator having an electrically wound stator and magnets on said rotor radially adjacent to said stator with a radial air gap between them.

4. The invention as in claim 1 and further including a plastic ring closely surrounding said turbine blades and engagable by the blades in case of excessive growth of the rotor outer diameter in operation, the ring being formed of a material capable of interfering with rotation of the rotor by engaging the blade ends without causing significant damage thereto.

5. The invention as in claim 4 wherein said rotor and blades are formed from a plastic and said ring material comprises a high performance amorphous resin.

6. The invention as in claim 1 wherein said nozzle valve includes an arcuate flow control passage rotatable into and out of register with said nozzles.

7. The invention as in claim 6 wherein said arcuate passage has an end of reduced radial width where it registers with a first one of said nozzles to control idle air flow through said first nozzle.

8. The invention as in claim 7 wherein said reduced width end tapers essentially to a point.

9. The invention as in claim 7 wherein said first nozzle is of reduced size.

10. The invention as in claim 6 and further including an additional nozzle and an idle air control valve controlling air flow to said additional nozzle for idle speed control.

11. The invention as in claim 10 wherein said idle air control valve is fed by a separate idle air port not controlled by said nozzle valve.

12. The invention as in claim 11 wherein said additional nozzle is configured to accelerate idle air flow to supersonic velocities.

13. A turboalternator and air flow control assembly for mounting on a combustion air intake of an internal combustion engine, said assembly comprising:

a body having an inlet and an outlet and defining therebetween an air flow path;

a nozzle carrier in the body and defining a plurality of turbine nozzles spaced arcuately about and generally parallel with a central axis, said nozzles having inlet and outlet ends and forming a portion of said air flow path;

a rotor mounted in the body on bearings for rotation on said central axis, said rotor being drivingly connected with an electric generator and including a turbine wheel having blades axially adjacent and radially aligned with said nozzles;

a bypass passage in said body and connecting said inlet and outlet separately from said nozzles, said bypass passage having an annular inlet that substantially surrounds and is centered on said axis; and a bypass valve in said bypass passage and operable to control air flow through said bypass passage.

14. The invention as in claim 13 and further including a nozzle valve adjustable to restrict or close one or more of said nozzles and said bypass passage inlet to separately control air flow to the turbine blades and through said bypass passage.

15. The invention as in claim 4 wherein said bypass valve and said nozzle valve comprise a single valve member that moves axially to control bypass flow and performs rotary oscillation about said axis to control air flow to the turbine blades.

16. The invention as in claim 15 and further including a contoured projection on said valve and extendable into said annular inlet to control the amount of bypass opening.

17. A method of regulating the output voltage of a permanent magnet alternator drivingly connected with a turbine driven by combustion intake air admitted at varying rates to an internal combustion engine, said method comprising:

providing a power control bypass valve operable to control flow through a bypass passage around the turbine;

closing said power control bypass valve to block the bypass flow and direct intake air through the turbine so long as said alternator output voltage remains below a preset limit; and opening said power control bypass valve whenever the output voltage reaches said preset limit, said valve opening being sufficient to control the flow of air through the turbine as necessary to limit the maximum turbine speed and thereby maintain said alternator output voltage substantially within said preset limit.

18. The method of claim 17 and further comprising:

temporarily limiting excess voltage output from the alternator by connecting the output to a supplemental load;

measuring current through the supplemental load and providing an analog signal proportional to said current; and controlling the opening of said power control bypass valve in proportion to said analog signal to reduce the alternator voltage output and limit current through the supplemental load.

19. The method of claim 18 wherein said supplemental load is a resistance load.

20. The method of claim 17 wherein an engine power control, in parallel with the power control bypass valve, is operable to limit flow to the turbine and to provide a primary turbine bypass for obtaining additional engine power, said method further comprising:

restricting flow through the power control in proportion to the opening of the power control bypass valve to maintain the flow of air to the engine essentially constant at the power level determined by the power control irrespective of the opening position of the power control bypass valve.

\* \* \* \* \*